(12) United States Patent
O'Brien et al.

(10) Patent No.: US 8,296,170 B2
(45) Date of Patent: Oct. 23, 2012

(54) PROCESS MANAGEMENT SYSTEM AND METHOD

(75) Inventors: Jay O'Brien, Vista, CA (US); Joby O'Brien, Vista, CA (US)

(73) Assignee: BP Logix, Vista, CA (US)

( * ) Notice: Subject to any disclaimer, the term of this patent is extended or adjusted under 35 U.S.C. 154(b) by 0 days.

(21) Appl. No.: 12/886,270

(22) Filed: Sep. 20, 2010

(65) Prior Publication Data

US 2011/0071869 A1    Mar. 24, 2011

Related U.S. Application Data

(60) Provisional application No. 61/245,409, filed on Sep. 24, 2009.

(51) Int. Cl.
*G06Q 10/00* (2012.01)

(52) U.S. Cl. ...................... 705/7.12; 705/7.27

(58) Field of Classification Search .................. 705/7.12, 705/7.27
See application file for complete search history.

(56) References Cited

U.S. PATENT DOCUMENTS

| | | | |
|---|---|---|---|
| 7,051,036 B2 | 5/2006 | Rosnow et al. | |
| 7,676,490 B1* | 3/2010 | Cassone et al. | 707/805 |
| 7,962,358 B1* | 6/2011 | Fernandez et al. | 705/7.12 |
| 2002/0065701 A1* | 5/2002 | Kim et al. | 705/9 |
| 2004/0078373 A1* | 4/2004 | Ghoneimy et al. | 707/10 |
| 2004/0225391 A1 | 11/2004 | Fromherz et al. | |
| 2005/0033600 A1 | 2/2005 | Geddes et al. | |
| 2005/0132167 A1* | 6/2005 | Longobardi | 712/201 |
| 2005/0234758 A1* | 10/2005 | Nishi | 705/8 |
| 2005/0267770 A1* | 12/2005 | Banavar et al. | 705/1 |
| 2007/0067196 A1* | 3/2007 | Usui | 705/8 |
| 2008/0133442 A1* | 6/2008 | Fischer et al. | 706/47 |
| 2009/0112666 A1 | 4/2009 | Guo et al. | |

FOREIGN PATENT DOCUMENTS

EP    1926041 A1    5/2008

OTHER PUBLICATIONS

International Search Report and Written Opinion for PCT/US2010/049801 issued Sep. 22, 2010, 9 pages.
iMarkup Server v6 Product Brochure, released Jan. 2006, 2 pages.
O'Brien, Joby. BP Logix Workflow & Document Management: Collaboration and workflow solutions for digital content and document management, Jan. 2009, 6 pages.
Workflow Management iMarkup Server v6: Collaboration and workflow solutions for digital content and document management, BP Logix, Inc., white paper, Nov. 2008, 6 pages.

* cited by examiner

*Primary Examiner* — Beth V Boswell
*Assistant Examiner* — William Brockington, III
(74) *Attorney, Agent, or Firm* — Procopio, Cory, Hargreaves & Savitch LLP

(57) ABSTRACT

A business process or project management system provides for creation of a project or process definition which includes all activities required to complete the process as well as any dependencies, conditions, and deadlines for each activity, and participants designated to carry out the activities. Once the process is started, activities are carried out in turn when the dependencies and conditions are met, and the system updates when any activities are complete so that any activities dependent on completed activities can be started. A reporting module creates status reports for each activity which are displayed to a user such as an administrator on a user interface. Stored information on previous instances of an activity are used to predict when an activity is likely to be late and to provide alerts to users prior to starting the activity.

40 Claims, 26 Drawing Sheets

FIG. 6

New Hire Process

Options

Actions: Create Activity, Expand All, Collapse All

| Index | Activity | Participants | Actions | Timeline 1 2 3 4 5 6 7 8 9 10 11 12 |
|---|---|---|---|---|
| 1 | Requisition Approval | ● | ↕ ↑ ✈ | ▬ |
| 2 | Recruiting Stage | | ↕ ↑ ✈ | ▬ |
| 3 | Provisioning Phase | ✈ | ↕ ↑ ✈ | ▬ |
| 3.1 | Fill Out Provisioning Form | ✈ | ↕ ↑ ✈ | ▬ |
| 3.2 | Facilities Activities — 45 | | ↕ ↑ ✈ | ▬ |
| 3.2.1 | Assign Office | ♦ | ↕ ↑ ✈ | ▬ |
| 3.2.2 | Install Office Furniture | ♦ | ↕ ↑ ✈ | ▬ |
| 3.2.3 | Assign a Phone Number | ♦ | ↕ ↑ ✈ | ▬ |
| 3.2.4 | Provide Cell Phone | ♦ | ↕ ↑ ✈ | ▬ |
| 3.3 | IT Activities | ♦ | ↕ ↑ ✈ | ▬ |
| 3.3.1 | Add User to AD | ● | ↕ ↑ ✈ | ▬ |
| 3.3.2 | Setup Email Account | ● | ↕ ↑ ✈ | ▬ |
| 3.3.3 | Grant VPN Access | | ↕ ↑ ✈ | ▬ |
| 3.3.4 | Application Access | | ↕ ↑ ✈ | ▬ |
| 3.3.5 | Install PC at Desk | ♦ | ↕ ↑ ✈ | ▬ |
| 3.4 | HR Activities | | ↕ ↑ ✈ | ▬ |
| 4 | Onboard | | ↕ ↑ ✈ | ▬ |

Name: Order Business Cards

Tabs: Activity | Participants | Start When | Completed When | Needed When | Due Date | Notifications | Advanced Options ~207

- ☑ Is activity required to complete parent
- ☑ If time limit for this activity expires, show error in reports
- ☑ If activity does not start on time, show error in reports
- ☐ Re-authenticate users
- ☐ Prompt for Signature Comments Possible responses from participants: (Comma-separated list):

Use eForm for Activity

FIG. 12

Total Run* 12
Maintained by System - Sum of # runs in 3 Buckets

| | # Runs Maintained by System | Running Ave for instances in this bucket Maintained by System | Configured Weight Configured by User | Calc'ed Weight by Number of Runs (# Runs / (Total_Runs*2)) * Configured_Weight | Calc'ed Weight % by Number of Runs Calced_Weight / SUM (All_Calced_Weights) | Predicted Times Calced_Weight_% * Running_Average |
|---|---|---|---|---|---|---|
| Configured | | This value is configured on the activity definition | | | | |
| | 12 | 10 | 1 | | 22% | 2.2 |
| | This value is the total number of runs | | | | | |
| Bucket 1 (less than 50% of configured) | | Ave time for runs in this bucket | | | | |
| | 2 | 3 | 2 | 0.5 | 7% | 0.2 |
| | Total number of runs whose time was less than 50% of configured number | | | | | |
| Bucket 2 | | Ave time for runs in this bucket | | | | |
| | 6 | 9 | 5 | 0.2 | 56% | 5.0 |
| Bucket 3 (more than 150% of configured) | | Ave time for runs in this bucket | | | | |
| | 4 | 20 | 2 | 1.3 | 15% | 3.0 |
| | Total number of runs whose time was greater than 150% of configured number | | | | | |
| Total Runs | 12 | | | 0.3 | 100% | |

| | SUM (Predicted_Times) |
|---|---|
| Predicted Time For Activity To Run | 10.4 |

FIG. 21

PROCESS MANAGEMENT SYSTEM AND METHOD

RELATED APPLICATION

The present application claims the benefit of co-pending U.S. provisional pat. App. Ser. No. 61/245,409, filed Sep. 24, 2009, the contents of which are incorporated herein by reference in their entirety.

BACKGROUND

1. Field of the Invention

The present invention relates generally to systems and methods for managing or automating workflow processes, particularly non-linear processes or projects.

2. Related Art

Various systems and methods are known for managing ongoing business processes. A business process is a set of activities involving a company's day-to-day operations designed to accomplish a particular goal. Business processes produce the same product or service repeatedly, hopefully with the same high quality in a timely manner. While business processes are typically repetitive in nature, the details of each instance can be unique. Time to complete a process is critical to its overall effectiveness. A delay in any step of the workflow has a trickle down effect to remaining activities.

Known business process management (BPM) software tools are often used to automate and report on repeatable business processes. Example processes include the approval process for finance related requests (Purchase Requisition approvals, Invoice approvals, etc), Human Resource processes (vacation request, new hire requisitions, new hire provisioning, etc), Information Technology processes (Change Requests), and document review and approval processes. These processes typically involve multiple people, groups, and external systems. The BPM tools reduce errors, automate manual tasks, automate notifications, report on status of processes, and aid in timely completion of these processes. Traditional workflow/BPM products model processes in various ways but ultimately the workflow process is represented by something resembling a linear flowchart. Traditional BPM tools use a modeling tool to "describe" the process to be automated. This definition (e.g. flow chart) is then compiled or rendered into a different format (internally) for automation. Existing BPM software products are not ideal for non-linear processes which have multiple activities that occur with certain dependencies (i.e. certain activities cannot start until others are completed), but the order of carrying out the activities does not necessarily follow a specific linear sequence.

SUMMARY

Embodiments described herein provide for a business process management system and method which is activity based, rather than flow chart based, and allows definition of a workflow process through a series of activities and sub-activities within a project management interface, so that non-linear workflow processes can be managed and monitored. This approach provides a foundation for predicting the start and completion dates of future activities, which is not normally achievable in a flow-chart oriented workflow model.

According to one embodiment, a process or project management system is provided in which a process or project definition created by an administrator includes all activities required to complete the process as well as any dependencies, conditions, and deadlines for each activity, and participants designated to carry out the activities. Once the process is started, activities are carried out in turn when their associated dependencies and conditions are met, and the system updates when any activities are complete so that any activities dependent on completed activities can be started. A reporting module creates process status reports which are displayed to a user or administrator on a user interface.

In one embodiment, the process or project is defined by administrator entry of selected activity information on a series of web-based user interfaces having areas for administrator entry of activities required to complete the process, conditions for each of the activities, dependencies of each activity on any other activities being completed, participants and participant contact information for each activity, conditions for completion of each activity, conditions for starting each activity and terminating the activity without completion, deadlines for completing the activity, and user notifications. The definitions may also include a weighting for each activity which indicates the relative importance of the activity within the scope of the project or process. Each parent activity may include one or more sub-activities, sub-sub-activities, and so on, which are defined in a similar way. Once all definitions for all activities required to complete a process have been input, a tree structure is built to represent the process, with nodes for each parent activity, and branches from each node with additional nodes for child or sub-activities, branches from any sub-activity with its own child activities, and so on. The process definition tree structure is stored in a data base and awaits start of the process.

After all activities are entered, the project or process is started based on the conditions entered. Historical information is maintained for each activity that has run in all running/completed instances of the process. This historical information contains the average completion times of all past activities. Participants in activities that can be started are notified (i.e. activities not dependent on completion of other activities or other events or conditions), starting with the lowest activity in the tree structure. Activity progress is tracked and any state or data changes are saved to allow reporting of the process status on a report displayed to an administrator or participant in a user interface. In one embodiment, the process status is reported in a Gantt chart with time lines indicating each activity's status. An aggregate process status may be calculated from a weighted perspective, using the weighting of each activity and the percentage completion of the activity and all of the sub-activities or children of that activity.

Once activities have been started, the status of the each current activity is checked after expiry of predetermined time periods. First, a check is made for completed activities, in which the tree structure is checked for each activity in turn, starting at the lowest child activity and working up through the tree. If all activities are found to be either completed or are canceled as a result of this check because the time has expired or other criteria are not met, the process finishes. If there are still incomplete activities after the completed activity check, a check is made for any activities that can be completed, for example because they are not needed, and any activity that can be started because other activities on which they depend are completed or other conditions are met. Participants for any pending activities which are dependent on a completed activity are then notified. Activities which are still in process are also monitored for state changes, and if a state change is found, the activities are again checked for completion.

During the activity monitoring or checking process, memory updates are made based on any detected state changes or completed activities, and these are then transferred to the data base to update the stored process information so that the process manager and other personnel can see updated process status reports with completion and percentage or weighted percentage completion data for each activity. This can also indicate which activities are behind schedule.

According to another aspect, a workflow process management system is provided, which comprises an electronic form or user interface module for user or administrator entry of a process or project definition including all activities required to complete the process/project, a reporting module which creates process status reports which are displayed to a user on a user interface, a process automation/state module which creates a tree structure for each process definition and which controls the automation of process activities, and a data base associated with the user interface module, reporting module, and process automation module to store process definitions entered by an administrator, a tree structure created by the state module to represent the process, and any activity status change detected by the process automation module.

The process automation module is adapted to run through the tree structure repeatedly to check for completed activities, activities that can be completed, activities that can be started, and any changes in state. The user interface module contains a plurality of user entry forms for entry of process definitions comprising activities and any child or sub activities required to complete each activity, dependencies of each activity and child activity on completion of any other activities, conditions for completing each activity, conditions for starting each activity, conditions for canceling an activity without completion, participants for each activity, and deadlines for completion of each activity. The reporting module creates user reports showing the current status of all activities of a process.

This system and method allows workflow processes to be defined in a project management framework using an activity-based, project management-like interface. The process is then controlled and automated through the state process automation module which starts activities and converts activity timelines to absolute dates and times. The timeline and the activity due dates can optionally take into account business days (eliminating holidays and weekends from the calendar). Status reports can be provided through a Gantt chart interface with overlay of activities on a timeline.

In one embodiment, an aggregate status across multiple activities can be provided, and this may be based on activity weightings entered by the administrator when initially setting up the process or project.

The process management system and method can be used for any type of business process or project that requires automation, tracking and reporting, for example information technology (IT) provisioning, sales order processing, human resources (HR) applications. The system provides the ability to give early notifications when an activity is predicted to be late. By keeping track of the past performance of all prior activities and using that information with the running state of the process, the start and end time of all future activities can be calculated (predicted). This allows interested parties to be notified (e.g. email, report) when an activity or set of activities are projected to be late, prior to the activity even starting. Users can choose different activities that they want to monitor and the condition that indicates a problem is going to occur.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 6 illustrates one example of a screen shot or user interface illustrating options for creation of a project definition and activities associated with the project;

FIG. 7 illustrates a similar screen shot to FIG. 6 but after an administrator has entered all definitions and the process has started, with a Gantt chart indicating the relationship of each activity;

FIG. 10 illustrates a screen shot with a pop up user interface window for entry of process definitions;

FIG. 11A is a screen shot of a user interface within a web browser which is accessed from the interface screen of FIG. 6 and used for entry of an activity type and instructions for completing the activity;

FIG. 11B illustrates a subsequent user interface or pop up window used for entry of participants to be assigned to an activity;

FIG. 11D illustrates the next activity defining user interface used for entry of conditions to be met for the activity to be satisfactorily completed and conditions which define when the activity should be terminated;

FIG. 11E illustrates the next activity defining user interface used to enter conditions for enabling or starting the activity;

FIG. 11F illustrates the next activity defining user interface used to define a due date for the activity, as well as a menu for selecting what action should be taken if the activity is not completed by the due date;

FIG. 11G illustrates the next activity defining user interface used to define users to be notified when the activity changes state;

FIG. 11H illustrates the final, optional activity defining user interface used for entry of other options, such as when to show errors in reports;

FIG. 12 illustrates one example of a graphical user interface (GUI) used to create conditions for an activity;

FIG. 21 is a table illustrating one embodiment of a method of predicting the time for an activity to run based on stored times for previous running of the same activity.

DETAILED DESCRIPTION

Figure 1:
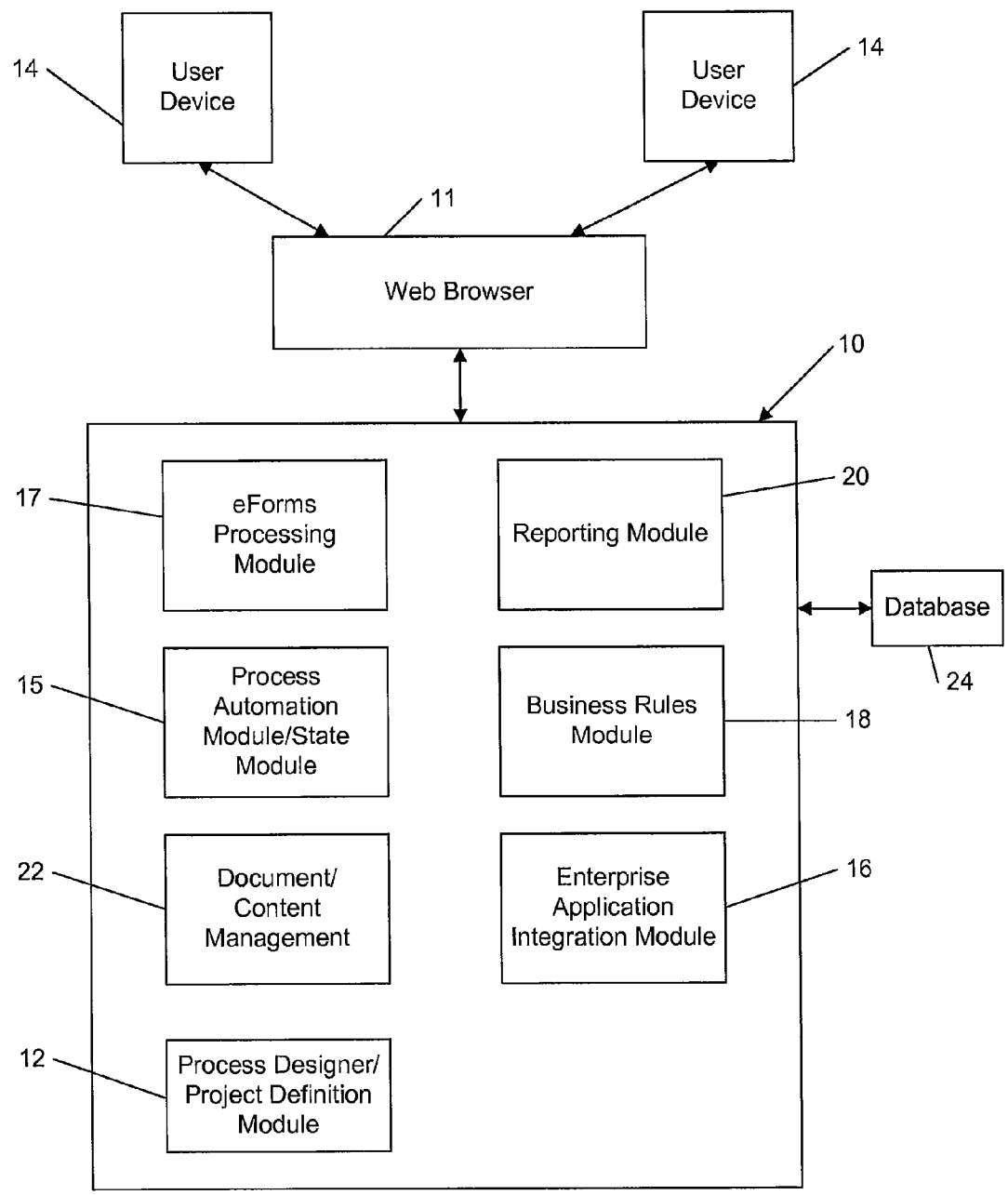
FIG. 1 is a schematic block diagram of one embodiment of a workflow process management system architecture.

Certain embodiments as disclosed herein provide for a workflow process management system and method for automating non-linear workflow processes including project-like processes.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention.

Some terms used in this description have the following definitions:

Administrator—The administrator is the individual who defines or sets up the project and administrates the project. More than one individual may act as administrator for a project. The administrator may be a project manager, department head, project designer, or any other personnel defined as administrators for the purpose of any project or business process.

Participant—User or worker assigned by an administrator or otherwise assigned to carry out defined tasks or activities required for completion of a project or process.

Project Process or Timeline Definition (aka Project Plan, Project Map)—this is the object that contains all the information to run and administer a reproducible process or project. This contains a list of activities. A project is similar to other objects in the system; it has permissions associated with it, meta data, and other attributes/properties. A project or timeline definition is similar to a workflow definition in a conventional flow-based workflow management system, but defines and executes the process in a unique way.

Project or Process Instance—the running or completed occurrence of a project or process (as compared to a definition). Each time a project is "run", a new project instance is created. For example, for each new New Hire, a new Project Instance is created from the Project Definition.

Activity (aka Activity Definition)—an activity is an item in a business process or project. It contains properties that determine how it should function. It defines when an activity should start, when an activity is considered complete, and when it is enabled (needed). It also contains properties for due dates, weighting (for reporting/status), and participants. An activity is conceptually similar to a step in a workflow. There are several possible activity types, as follows:

User—user or participant activity with conditions that determine how many users must complete, what choices they can make, and what constitutes this activity as being completed.

Attach—this will attach an object in the content database to the process

Script—this allows a custom script to be run

Custom Task—this allows custom scripts to be packaged into a reusable module with configuration parameters that can control the processing of the custom code.

Meta Data—used to set the project "package" and all the contents to the meta data specified (this is either configured on the activity or it can take meta data from the form instances and apply that to the project data.

Form—used to attach a new eForm and to change the current form viewer of the project.

Process/Workflow—this starts the workflow or project configured with this activity.

Notify—email notification only to users known to the system to external users

Branch—used to jump control to another activity within the timeline process

End—used to terminate the timeline process

Activity Instance—the running, pending or completed occurrence of an activity. Each time an activity starts, an Activity Instance is created, based on the Activity Definition.

Condition—this is a rule that is defined with a graphical interface allowing a user to define when a condition is met. Conditions can use information from eForms, from the workflow or project, information about the system, or information about the current user. The condition can contain Boolean operators and will result in a true or false.

Business Rule—this is an object in the application that is configured by the administrator that returns a result or values based on the conditions.

eForm—an electronic form is a web-based user interface which is a representation of a paper form displayed as hypertext markup language (HTML) in a web browser.

Enterprise Application Integration (EAI)—this refers to different types of integrations with different applications. Examples include database integrations, Web Services, Email Systems, etc.

Workflow Definition—this is an object that contains all the information to run and administer a reproducible process. This is the more traditional way that processes are defined, through a flowchart modeling interface. This is usually represented in a flowchart format as a series of steps that will run in the order specified.

Workflow Step (aka step)—this a step in a workflow. This is conceptually similar to an activity in a project. It contains properties that determine how the step should function. It defines who is assigned to the step, when a step is considered complete, and a due date.

Workflow Branch—this is a connector in a workflow. This connects two steps. It can contain optional conditional criteria that indicate when the branch should be taken by a running workflow. The default behavior of a branch is to take the branch associated with the highest number of users that selected it (the branches are represented as buttons on the eForm presented to the user when they are completing this task).

Task—this is what is assigned to a user or participant when they are a participant in a workflow step or project activity. A task is assigned to a user and provides them with instructions on how to complete the task and when it is due.

The workflow process management software described below allows the definition of a workflow process (for automation) through a series of activities and sub-activities within a project management interface (e.g. project plan, Gantt chart). This allows for the definition and automation of non-linear workflow processes. Activities in a project or process have attributes and rules that define the conditions required to start and/or complete an activity. Traditional workflow/BPM products model processes in various ways but ultimately the workflow process is represented by something resembling a flowchart. The new approach to BPM described below addresses certain types of processes that are non-linear, meaning they can have multiple activities that must occur with certain dependencies, but the order does not necessarily follow a specific sequence.

One example of a "non-software" type of non-linear process follows. This is an example of describing to someone how to clean a house. Traditional BPM tools would map the process out showing which rooms to clean from a more linear perspective (a flow chart). Instead, the system and method described below creates a new way of defining a workflow process, using activity-based definitions rather than via a flow chart. The order of the rooms that are cleaned is not necessarily important; however there are certain dependencies and rules that exist. For example, you may indicate that the kitchen floor cannot be mopped before the counter tops are cleaned. Another rule may exist indicating that the office cannot be cleaned the first two weeks of every month because it will be occupied. A project management methodology allows all of the activities involved to be defined (i.e. what needs to be cleaned) and the dependencies and rules associated with each.

More realistic types of process which would benefit from the activity based project or process definition and processing as described in the embodiments below are new hire onboarding, provisioning processes and sales order processing. Provisioning includes anything where a series of activities must occur, generally loosely ordered. Examples of provisioning processes include the allocation of resources and equipment needed for a new hire at a company.

FIG. 1 illustrates one embodiment of computer system architecture 10 for an activity based workflow process management system and method described in more detail below. The system in one embodiment is a .NET based implementation comprising a web server application that provides interfaces over a network through a web browser 11, but other implementations may be used in alternative embodiments. The system includes one or more microprocessors or computers including a process definition or process designer module 12, and a process automation module or state module 14. Process definition module 12 allows a process to be defined by a process designer or administrator via the web browser on a user device 14 such as a laptop or desktop computer, personal digital assistant (PDA) or the like, as described in more detail below in connection with FIGS. 6 to 14. Process automation module/state machine 15 performs automation of the process as defined by the process definition. The system also includes e-form or electronic form processing module 17 used to generate and manage e-forms required for user entry of process related data. An administrator can interface with the e-forms processing module 17 directly in order to control the run-time/execution of a process as well as the graphical user interface or e-forms provided to end users or participants tasked with carrying out the activities. This processing module creates e-forms which are represented by web pages displayed on a browser, and in one embodiment module 17 may be designed to allow the initial document for creation of end user e-forms by an administrator to be created in MS (Microsoft) Word, and is configured to process the word document to create and render dynamic ASP (active server pages). Net forms for display in a web browser, as described in more detail below. Some examples of web pages created by module 17 for user administrator entry of information and selections (control inputs) are illustrated in FIGS. 6 to 8, 10 to 13, 18 and 19 and described in more detail below.

System 10 also includes an enterprise application module 16, a business rules engine or module 18 (see definitions above), a reporting module 20 which generates various status reports on receipt of user requests, and a document/content management module 22. The computer system 10 is associated with a data base 24 which stores project or process definitions as well as project status information. Document/content management module 22 controls storage of all data in data base 24 and provides an interface between the data base and other modules in a manner known in the field. During running of a process, documents and files with process information can be uploaded by end users, generally through the eForm web interface in module 17, and stored in data base 24 and managed by the document management module 22. Automation module 15 has process timeline definitions that are stored in the database. These definitions and their running instances have content management type controls such as permissions to control who can see/modify the definitions or running/completed instances, version control, and the like, which may also be managed by the document management module.

Any business rules entered by a process designer or administrator can be managed by the business rules module 18. The business rules control some of the processing in the automation module 15. The business rules allow conditions to be specified that can then control which activities in the timeline process definition are needed, when an activity is considered complete, when it should start, and what users are assigned to an activity. This allows a company's policies to be encapsulated in an object called a business rule, and that business rule can be used by the process automation module and other modules in the system. A business rule may be used to control the behavior of the eForm the user interacts with, it can control the format of generated reports, and the like. The business rule objects allow conditions to be defined and a result to be returned. For example, you may have a business rule called "Is Expedited". This can have conditions that indicate when this rule is true, e.g. president submitted the request OR the request is over some $ amount. A business rule object can also return users. For example a business rule named "Department Managers". This rule could return the appropriate user based on data on the form in the process that indicates the "department".

Enterprise application integration module 16 provides integration with external databases and with external applications such as web servers and email systems, in a manner known in the field. This allows existing information in an organization to be used for running the process, for example information stored in user databases or in e-mail contact lists. These may contain information about users such as their title, phone number, role, department they are in, e-mail address, and the like. The automation module uses application connectors to extract this information from the external data sources based on the configuration. This information can be used to control the routing and processing, for example, an activity in a timeline process can automatically assign a user or participant based on the department, or their role or authority in the business, for example any activity involving expenditure may assign participants authorized for expenditures of the expected dollar amount for the activity.

System 10 and the associated business process method include a project or timeline definition phase and a project monitoring and status reporting phase. In the project/timeline definition phase, a process designer enters various definitions to define activities to be completed in the project as well as conditions and dependencies for those activities, as described in more detail below in connection with FIGS. 6 to 14. A typical project definition includes a series of activities to be carried out in order to achieve the project objective, for example Activity 1, Activity 2, Activity 3, and so on. Each activity may have sub-activities or child activities, e.g. Activity 1.1, Activity 1.2 . . . , while the sub-activities themselves may have sub-activities, e.g. Activity 1.2.1, Activity 1.2.2 . . . , and so on up to any sub-level needed, depending on project complexity. When a user is creating a timeline definition (or activity based process definition) they are presented with information about each of the activities, including how long they take to run on average, and how many times the activity has run (see FIG. 21 example of a predictive algorithm which is described in more detail below). This information can be used to optimize the timeline definition and the creation of the interdependent activities (e.g. optimize the configured duration). It can also be used to predict the time for completing an activity and to notify users if a selected critical activity is likely not to be completed by a due date which they entered, as described in more detail below. During the project definition phase, the system detects and prevents entry of "unsolvable scenarios" or circular references using business rules module 18. Such scenarios involve activity conditions or dependencies which cannot possibly be met, such as Activity 1 depends on Activity 2 completion, Activity 2 depends on Activity 3 completion, and Activity 3 depends on Activity 1 completion.

Figure 2:
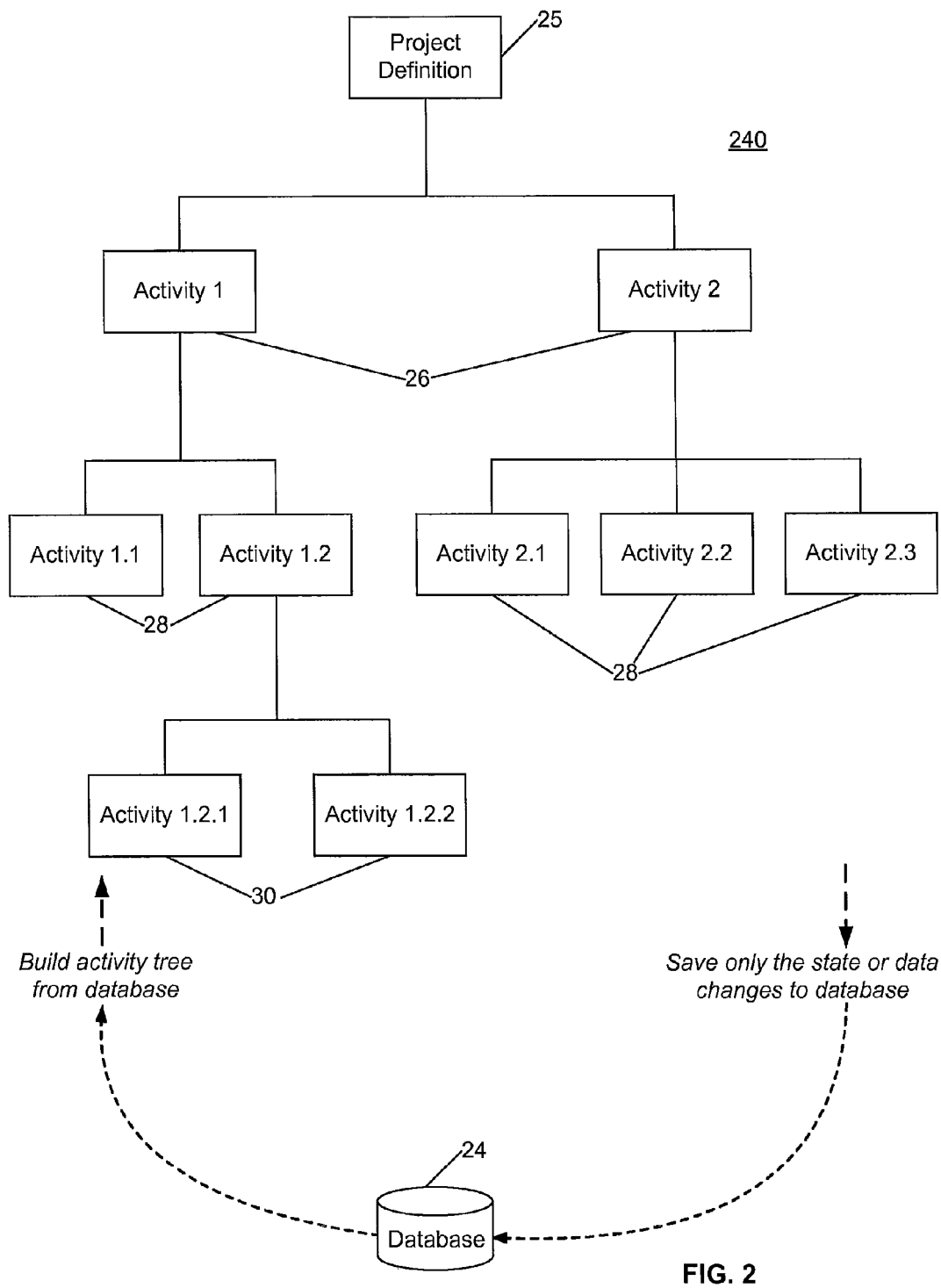
FIG. 2 is a block diagram illustrating an example of a project or process definition tree structure using the workflow management system.

Once all activities have been entered along with all associated information, conditions, and dependencies, the entire project or process definition 25 is stored in data base 24 and is built into a tree structure or state machine 240 as illustrated in FIG. 2 by automation module 15. The tree structure is read into memory in order to process the state machine. Each node of the tree structure represents an activity and contains the definition (schema) and the instances (i.e. the running occurrences of an activity or project). For each activity, there is a main node 26 which branches into any sub-activity or child activity nodes 28. In turn, the next layer of nodes also has branches leading to any sub-sub-activity nodes 30 of any of the sub-nodes. Additional layers may be provided under the lowest nodes in FIG. 2 if required in order to automate the project definition.

The state machine and tree structure 240 of FIG. 2 remain in memory until no additional state changes can be processed. When state or data changes occur, they are made to the state machine in memory and on the database 24. After all state changes are complete, the memory structures are destroyed, but they remain persistent in the data base.

Figure 3:
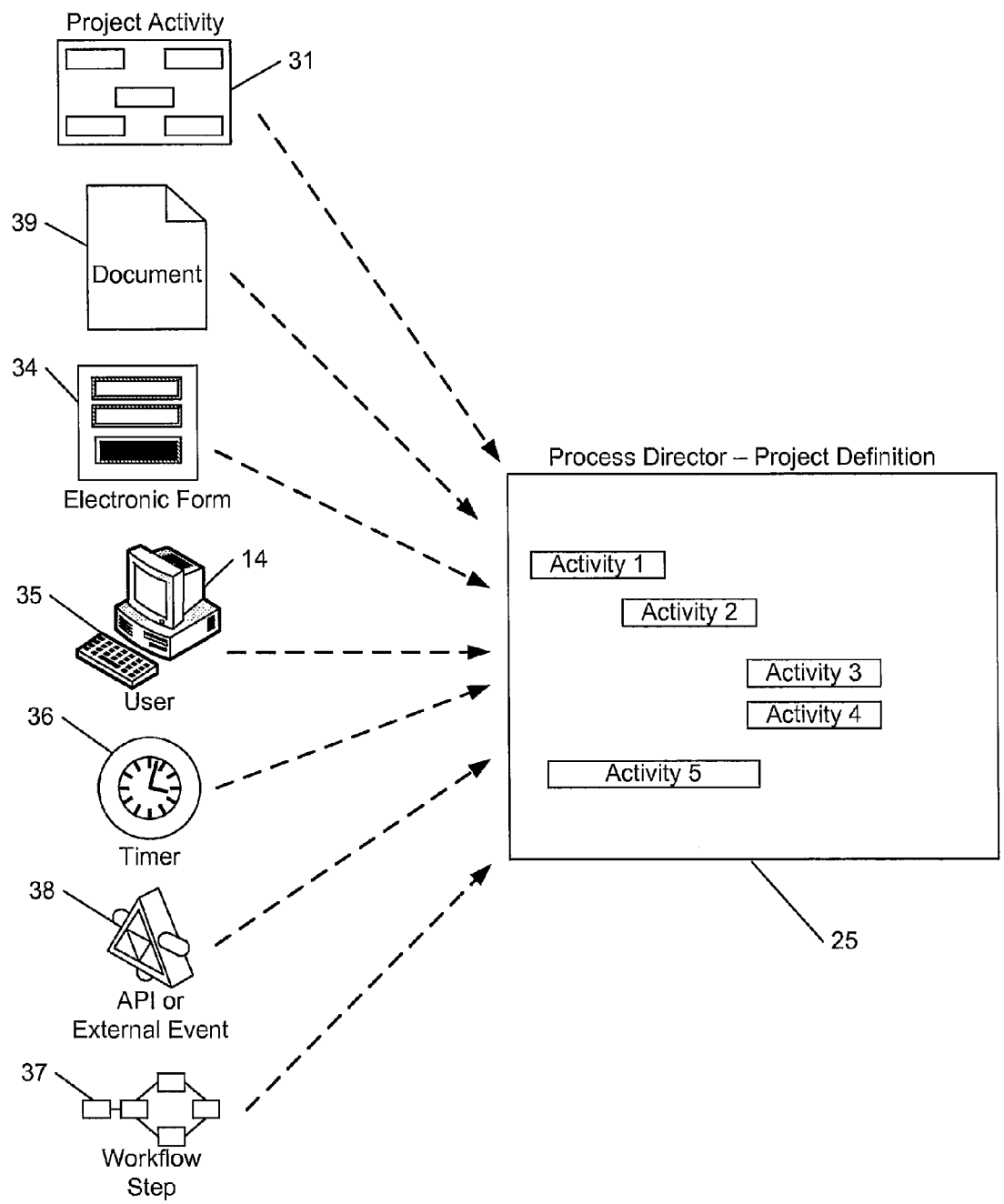
FIG. 3 is a block diagram illustrating how a project or process is started.

FIG. 3 is a schematic diagram illustrating how a project or process is started once the definition 25 is complete. A project can be started several ways.

when a user opens an electronic form, fills out the required data and submits the form (34) via the web browser of a user device.

by a user explicitly selecting a process to start (35) at their user device 14.

by an internal timer (36).

through an API call or external event (38).

the system can specify a process to start automatically when a document 39 is added to the product database. This can be through an automatic import from a Windows file system or the manual upload of a document to the product.

by a process activity (31).

by a workflow step (37).

In one embodiment, the process automation module is a powerful process engine capable of automating and managing the process activities. The process engine is to model review and approval procedures, automate the routing process, monitor results and satisfy content management needs, and may include the following process automation features:

Ability to automate complex, non-linear, processes

Rules-based business logic controls process routing

'Due date' management and escalation

Ability to be customized by business users without requiring programming

21 CFR Part 11, HIPAA and SOX compliant

Provide electronic signatures and audit trails

Figure 4:
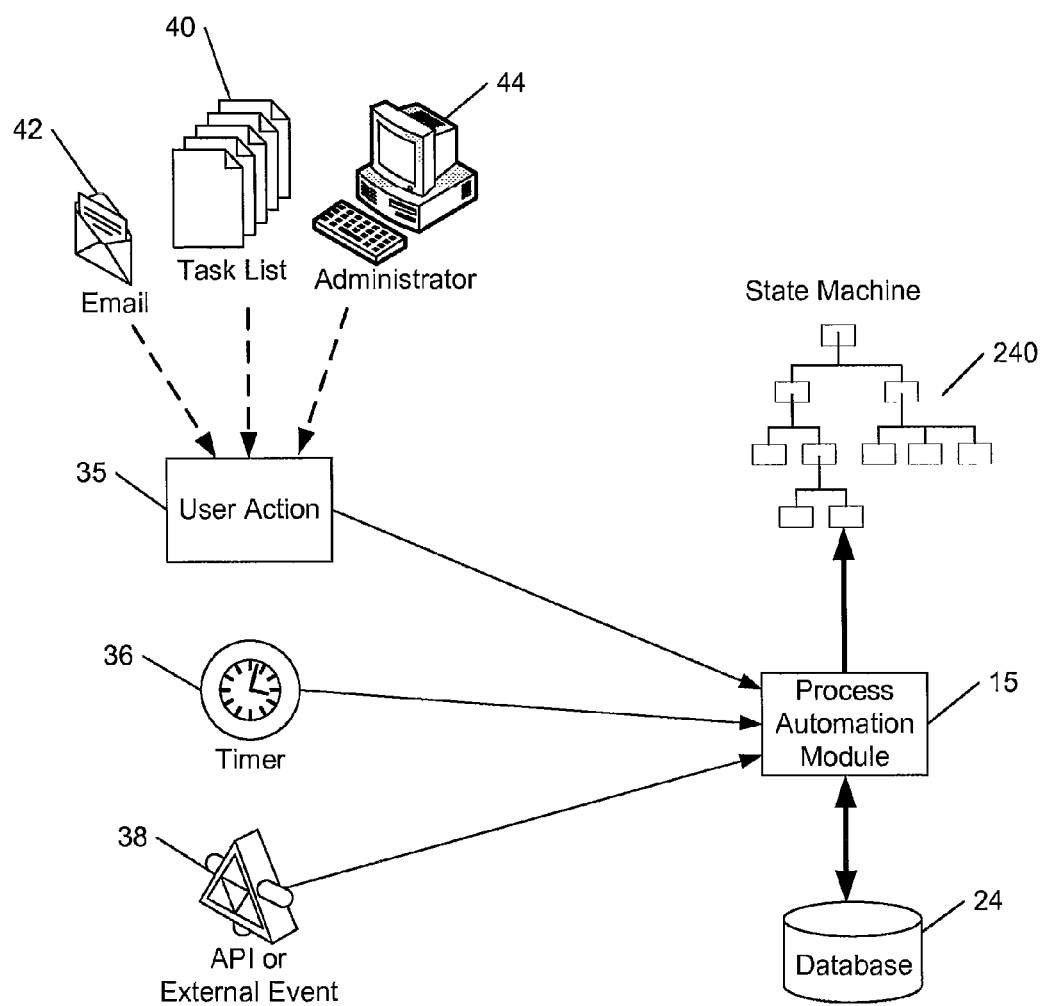
FIG. 4 is a block diagram illustrating different events which cause the project definition and running process to be read in from the database and loaded into the processor.
Figure 5:
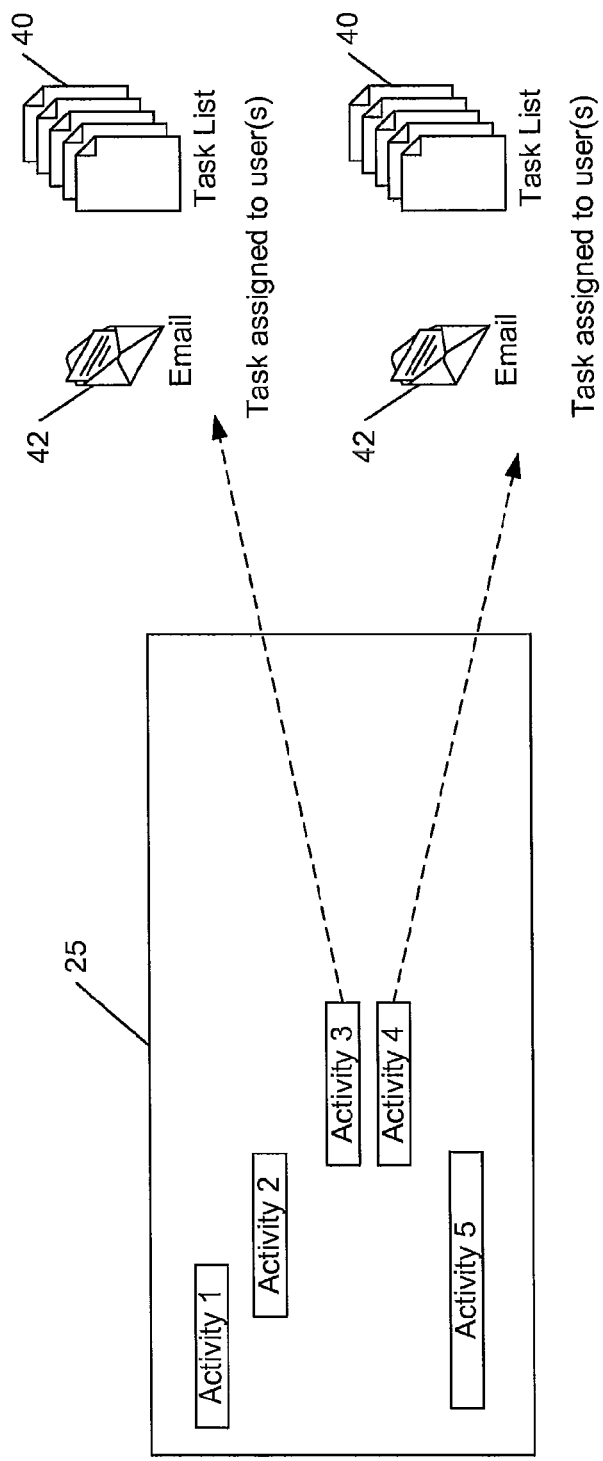
FIG. 5 illustrates assignment of tasks to participants when activities are started.
Figure 8:
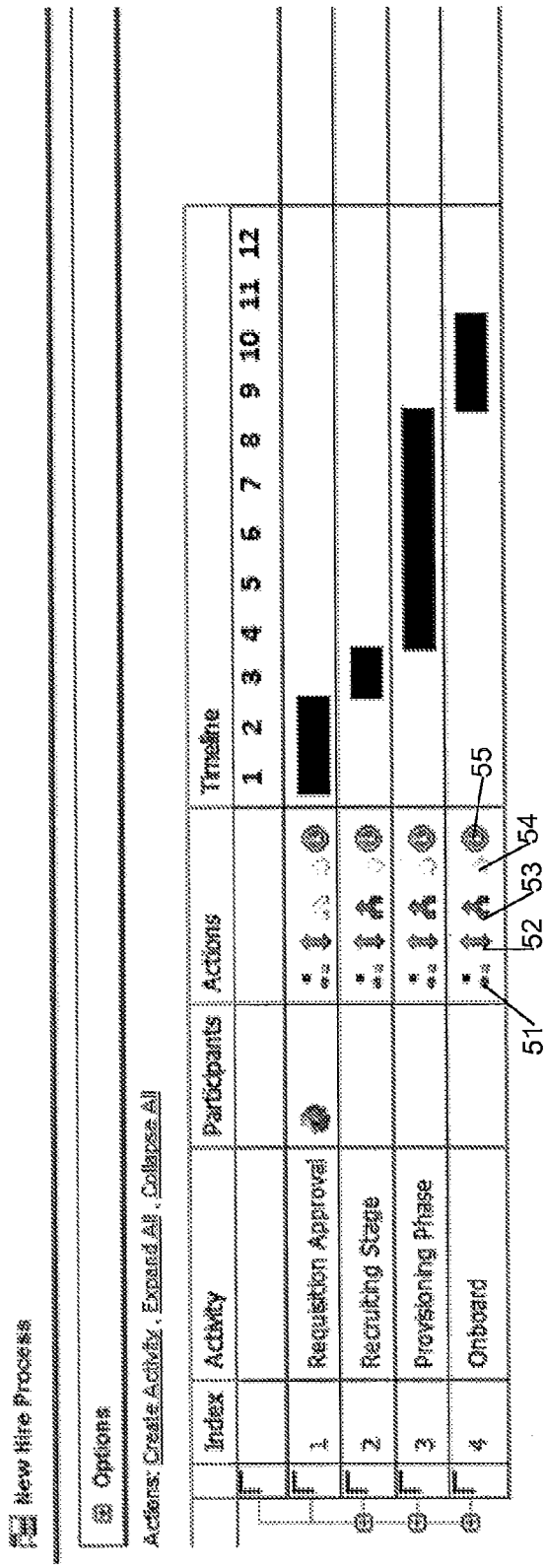
FIG. 8 illustrates the screen of FIG. 7 with the sub-activities collapsed so as to show only the main activities.

Different events cause the definition and the running process to be read in from the database and loaded into the state machine 240, as illustrated schematically in FIG. 4. The result of this may cause the process execution engine or process automation module 15 to change the state of an activity. The change will be reflected in the memory tree structure or state machine 240 and on database 24. The events include external API calls 38, internal timers 36, and user actions 35. User actions are driven by user tasks (via their task list 40 or emails 42) and administrative functions 44 (restarting an activity, changing the configuration, etc.). An activity may contain zero or more user participants (defined as users, groups, business rules and/or form fields). When an activity is started it assigns a task to all users. This results in an email notification being sent to each user and a task list item being added to their personal task list (this is a "to do" list that contains all tasks not yet completed by the currently logged in user), as schematically illustrated in FIG. 5 for activities 3 and 4.

One example of a process or project which can be automated using this system is an HR new hire process or new hire onboarding process. This is an example of how an HR new hire process can be defined, automated and reported on, using Process Director. This is one of the many types of processes suited to the Process Director and highlights its strong areas, and the weaknesses of traditional workflow modeling approaches.

In a new hire process, an HR manager generally has a series of items, or a checklist, that defines everything that must occur when a new employee starts with their company. This list of items (or activities as defined above) is well defined and each item or activity has rules and conditions associated with it. However, these are typically difficult to model in a flow chart because they are non-linear. The HR manager does not care about the overall order of items, they just want every activity to be completed as quickly as possible, while ensuring that any rules or dependencies are followed. This system is designed to complete the overall process faster by running as many activities as possible in parallel, based on the rules and dependencies established in the timeline definition which determines which activities can and cannot be run in parallel.

In this example, part of the timeline for an on-boarding process is used as an example (over simplified for illustration purposes). This timeline orientation provides the ability to coordinate and control many different workflow processes. A new hire process generally consists of more than just the on-boarding provisioning process, starting with the approval process for the new hire requisition, then going through the hiring/recruitment process or recruiting stage, and ultimately to the provisioning process when the employee starts. These are typically separate processes, but can be controlled and initiated through the same timeline definition, although the provisioning part or sub-process only is described in detail below. Each of the sub-processes may be a flow-chart oriented workflow process, or another timeline oriented process. An HR manager may have a checklist that appears as follows:

Get an Office Assigned
    Assign a Phone Number
    Provide Cell Phone/PDA
    Add User to Authentication System
    Setup an Email Address
    Install PC at Desk
    Give VPN Access
    Order Business Cards
    Send Welcome Email Each of these activities also has rules or conditions associated with them, for example:
    the new employee only needs a Cell Phone/PDA if they are in "Sales";
    the new employee only needs VPN access if they are working from home.

This information is known to the running project through the eForm interface that can query for, and display, data about the process, as described in more detail below. In this example, the eForm has a field to indicate the department the new employee will be working in (e.g. Sales) and whether they will be working from home. This is typically completed by the person filling out the e-form that starts the process, e.g. the hiring manager or other administrator.

The activities in a process also have dependencies which are set up in the project definition. For example, in the new hire process described above, the dependencies may be as follows:
    do not "Order Business Cards" until a "Phone Number" and "Email Address" are assigned;
    do not "Install PC at Desk" until "Office is Assigned";
    Setup an "Email Address" only after the user is "Added to Authentication System".

The dependency configuration allows any activity to be dependent on zero or more other activities. The dependent activities have to complete before any activity can start.

In the system and method of this embodiment, the "HR manager" or other administrator that defines this process does not need to provide it in a flow chart; instead it can be defined similar to a project plan in a project management application, for example as follows:
    1.0 Facility Activities
    1.1 Get an Office Assigned
    1.2 Assign a Phone Number
    1.3 Provide Cell Phone/PDA (condition: only if Sales)
    2.0 IT Steps
    2.1 Add User to Authentication System
    2.2 Setup an Email Address (dependent on 2.1)
    2.3 Install PC at Desk (dependent on 1.1)
    2.4 Give VPN Access (dependent on 2.1, condition: only if working from home)
    3.0 Order Business Cards (dependent on 1.0 and 2.2)
    4.0 Send Welcome Email (dependent on 2.3)

Figure 6:
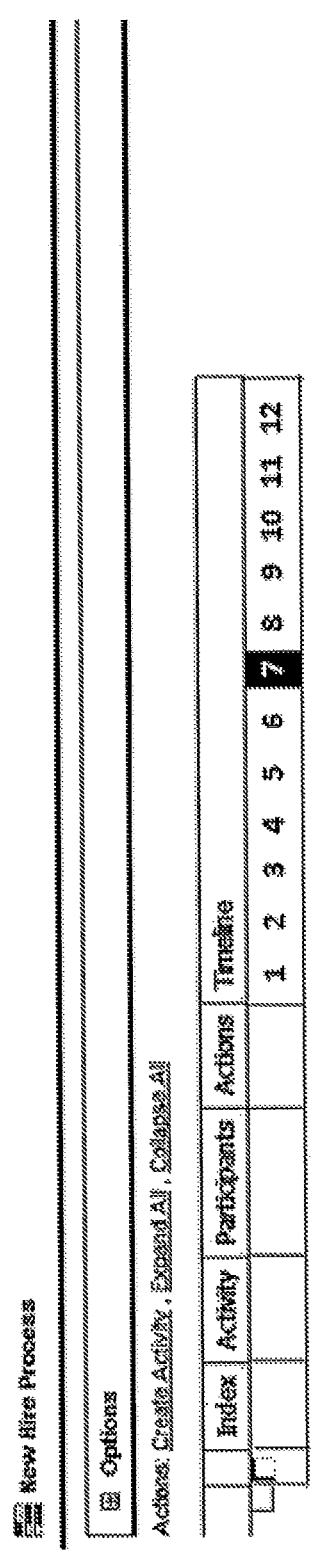

FIG. 6 is an image of a screen shot of an empty project definition screen before the manager or project designer has added any activities. FIG. 7 is a screen shot illustrating the same screen after entry of activities associated with the example of a new hire project as outlined above. As illustrated, each activity has a separate horizontal line or bar that is displayed. Activities have names and a hierarchy that controls how they are run. The administrator (such as a HR manager or other personnel, depending on the nature of the process) first names the process (in this example "New Hire"), and then can set up each activity by name and order in the hierarchy, along with the associated options, as described in more detail below in connection with FIGS. 10 to 14. In this example, each of the activities listed above for a New Hire process is provided with a line having a space 45 for the activity name, a space 46 for listing participants or links to participant information, a space 48 with icons 51, 52, 53, 54, and 55 which allow different actions as listed below, and an associated time line 50 which shows the ongoing status of the various activities once the project has started. The icons may be changed in alternative embodiments but in the illustrated embodiment the icons have the following functions:

Icon 51: Drag and drop the activity to move it under another parent.
    Icon 52: Drag and drop the activity to change the order in the project.
    Icon 53: Drag and drop the activity to another activity that is depends on. This sets the internal dependencies of the activity to reference the item it was dropped on. An activity can have multiple other activities that it is dependent on.
    Icon 54: Click on an icon to display the activity definition dialog as a popup windows (properties dialog).
    Icon 55: Click on an icon to display the conditions when this activity is needed (enabled).

Drag and drop can be used to modify the hierarchy of activities (parent/child relationships) and also to establish dependencies.

In the timeline, the solid color part 56 of each time line (shown in solid black in the drawings but can be any selected color, e.g. blue, in practice) indicates the configured length or duration of each activity. Any part of a timeline having an end portion of a different color indicates an activity that has child activities of longer length than the parent, so the administrator can correct the activity length. Activities can be expanded to see the sub-activities (children), as in FIG. 7, or collapsed to hide the sub-activities, as illustrated in the screen shot of FIG. 8. FIG. 7 is an activity based timeline for a process on initial set up of the process, i.e. before the process is started. The individual activity timelines are updated during the process based on ongoing status information received by the process automation module 15, as described in more detail below.

The user can click on the bar of an activity in the timeline (turning the background grey). This highlights the various dependencies. The activities that this activity is dependent on are shown with a color background, such as green, and the activities that are dependent on this activity are displayed with a different color background, such as red. Clicking on the selected activity bar again "deselects" the activity.

Figure 9A:
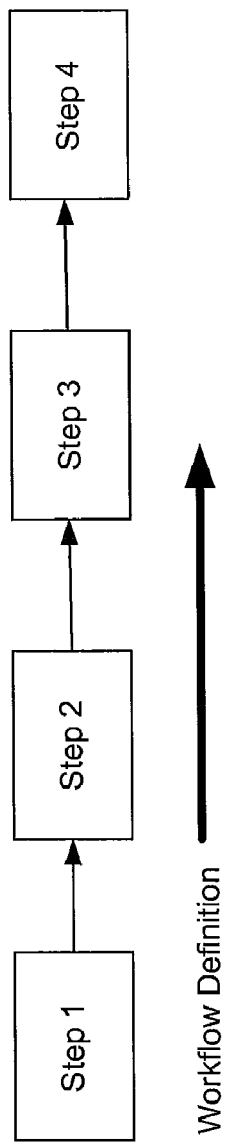
FIG. 9A illustrates a standard workflow definition process for a flow-chart based workflow automation system.
Figure 9B:
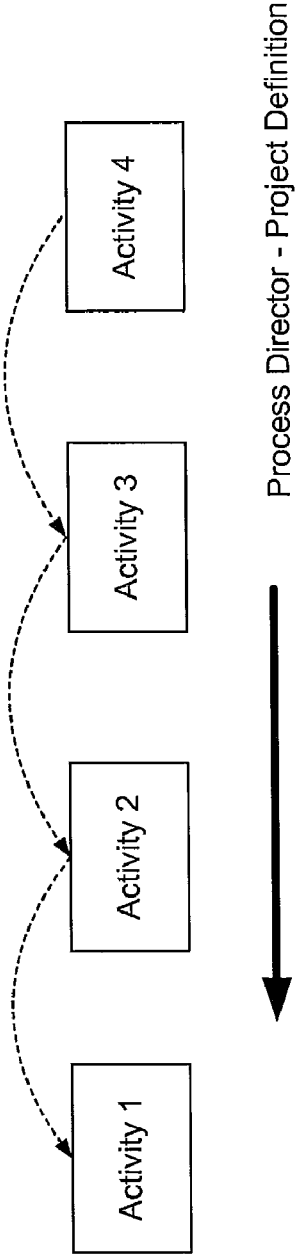
FIG. 9B illustrates a project or process definition method for the activity based workflow automation system and method of FIGS. 1 to 8.

FIGS. 9A and 9B illustrate the difference between a conventional workflow definition as in existing process management software (FIG. 9A), which is flowchart based, and project definition as in the process management system and method of this embodiment (FIG. 9B), which is activity based. Using a flowchart, you typically create a step, then pick a different step after the first step completes, and so on, as FIG. 9A illustrates. In the process management system and method of this embodiment, the definition is activity based, as in the principals of project management, in that you first define activities, then define pre-requisite activities which must complete before each activity is started. In the activity-based system, first all the activities are defined, and then dependencies are completed, for example activity 1 must complete before activity 2 begins, activity 2 must complete before activity 3 begins, and so on. Thus, the procedure for defining a workflow process is "where do I go next". With an activity-based process, the approach is to define "start this activity when".

Figure 10:
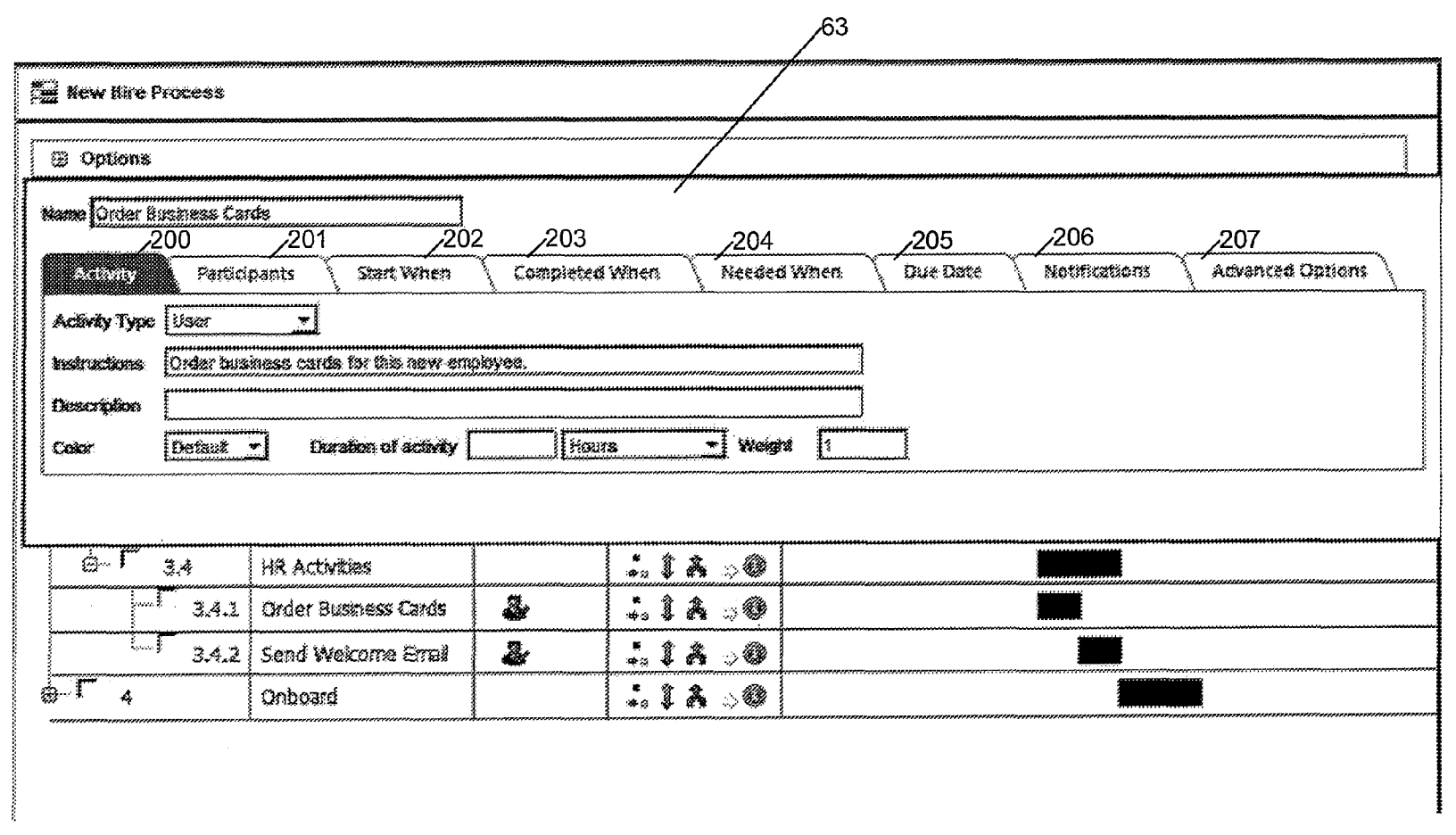
Figure 12:
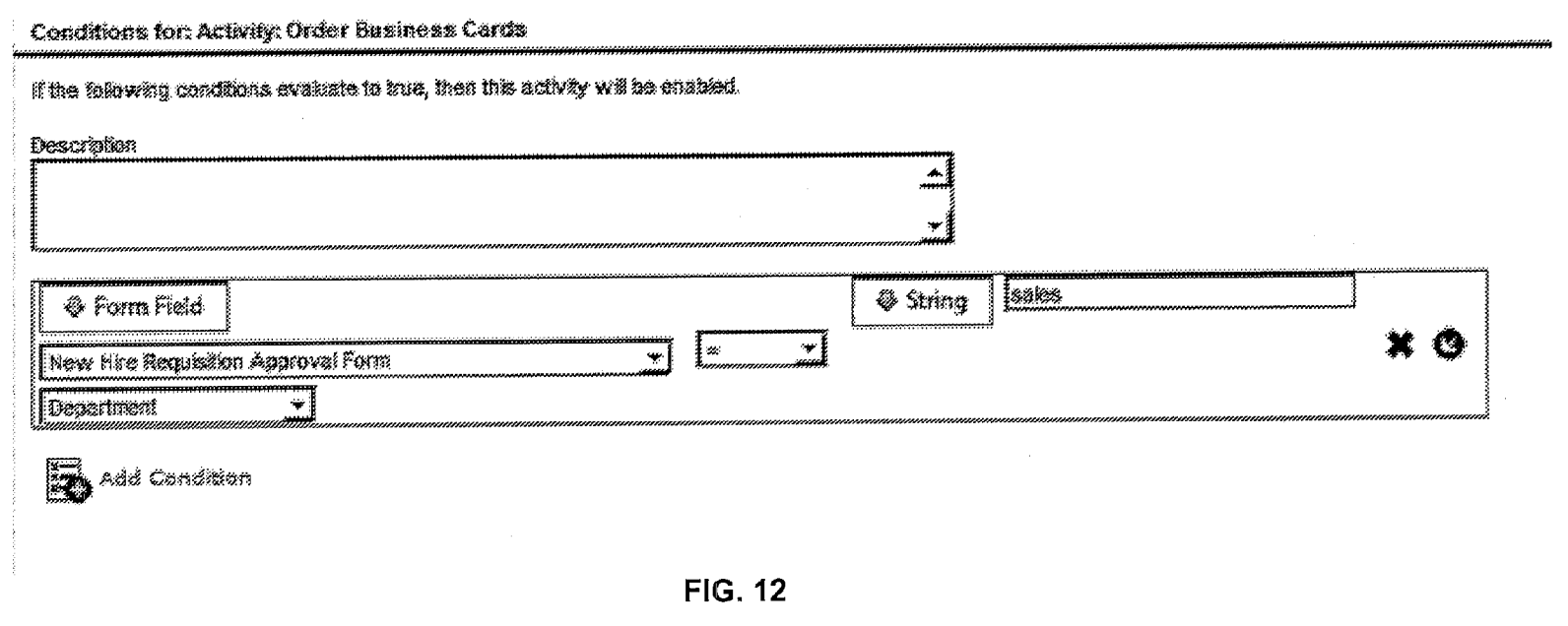
Figure 13:
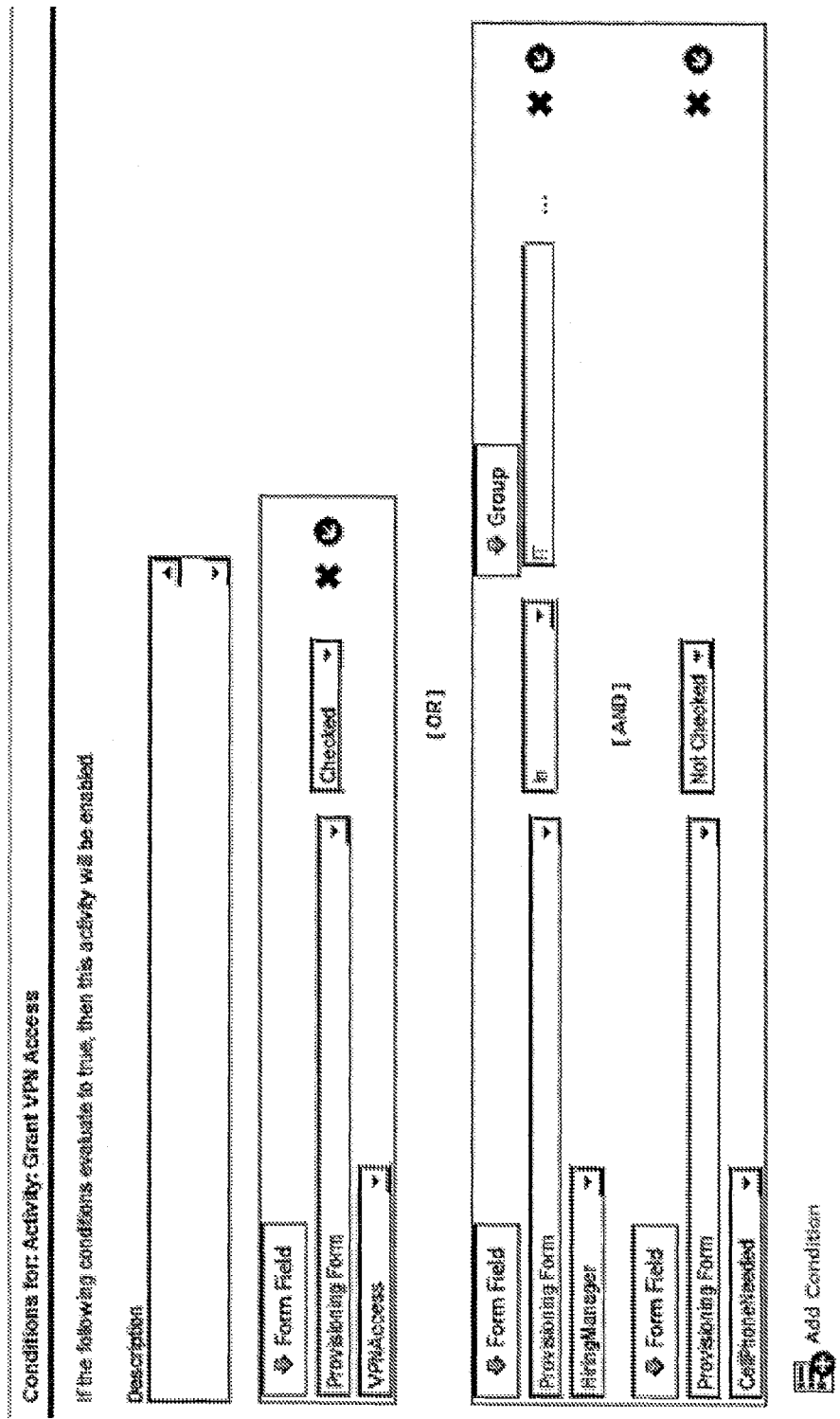
FIG. 13 illustrates the GUI of FIG. 12 with a more complex set of conditions for enabling an activity.
Figure 14:
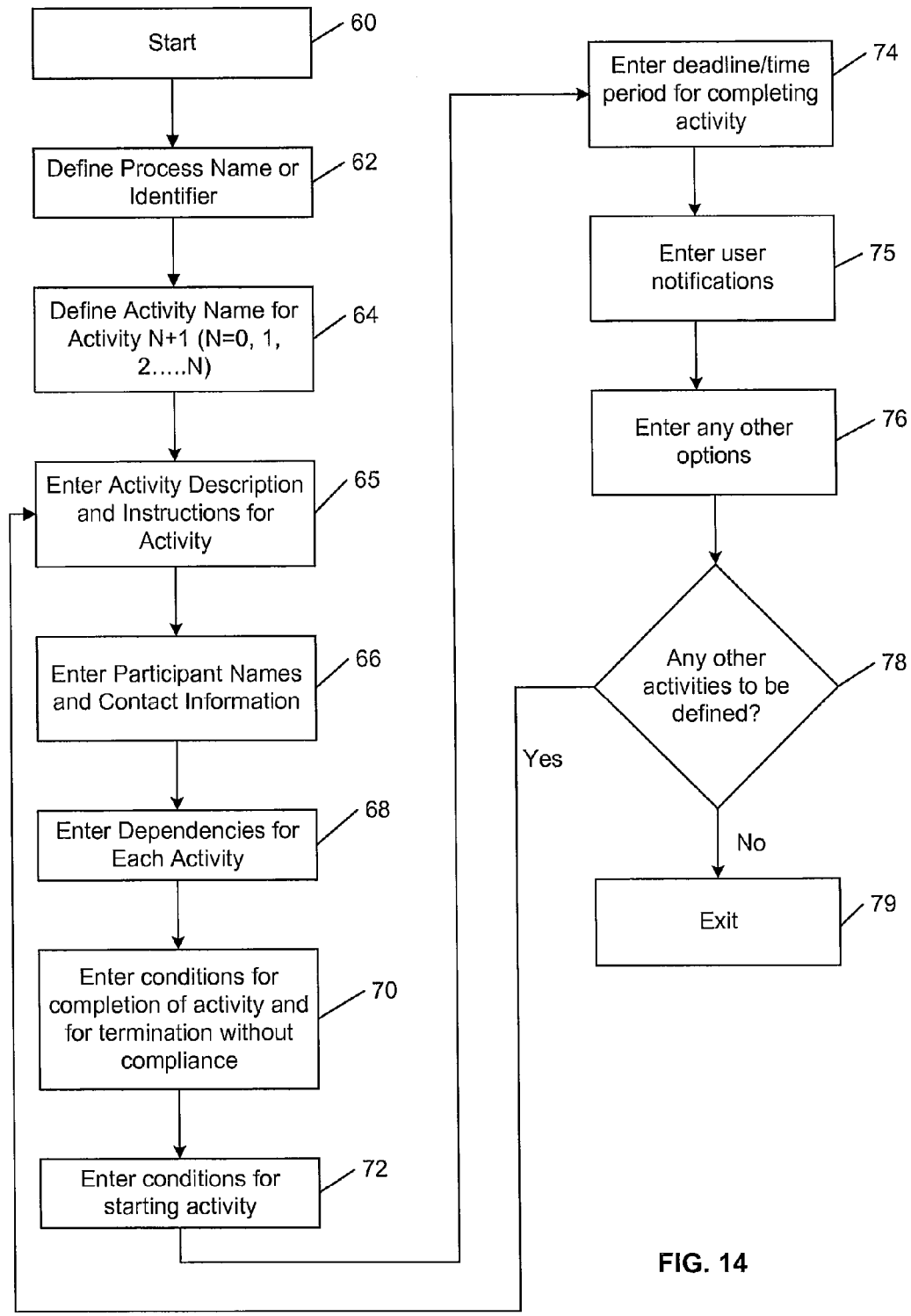
FIG. 14 is a flow diagram illustrating one embodiment of a method for defining a process using the system of FIGS. 1 to 10 and 11B to 13.

FIG. 14 illustrates one embodiment of a method of defining an activity-based project or process, while FIGS. 10 to 13 illustrate various pop-up windows or user interfaces used by an administrator or project designer during the method or process of FIG. 14 in order to enter the desired project definition. After the user starts a definition procedure (60) and defines the process name (62), they can add all the activities required to complete the process. For each activity, various pop up windows or user interfaces are displayed after the user clicks on the button "Create Activity" on the main screen (see FIGS. 6 to 8). FIG. 10 illustrates a pop up window or user interface 63 for defining an activity superimposed on the project definition screen of FIGS. 6 and 7. In this example, the user has already defined an activity name "Order Business Cards." (Step 64 of FIG. 14.) When the user clicks on the button 200 labeled "Activity" in the selection bar of the pop up window 63, the pop up window of FIG. 11A is displayed, allowing entry of the activity type (i.e. whether it is a user task activity or other), activity description, instructions for the user to complete the activity (65), as well as the expected duration of the activity (optionally in business days or other time units) and the weight of the activity relative to other activities in the process. An activity's weight is used to indicate the relative importance of the activity within the scope of the process.

Figures 11A, 11B:
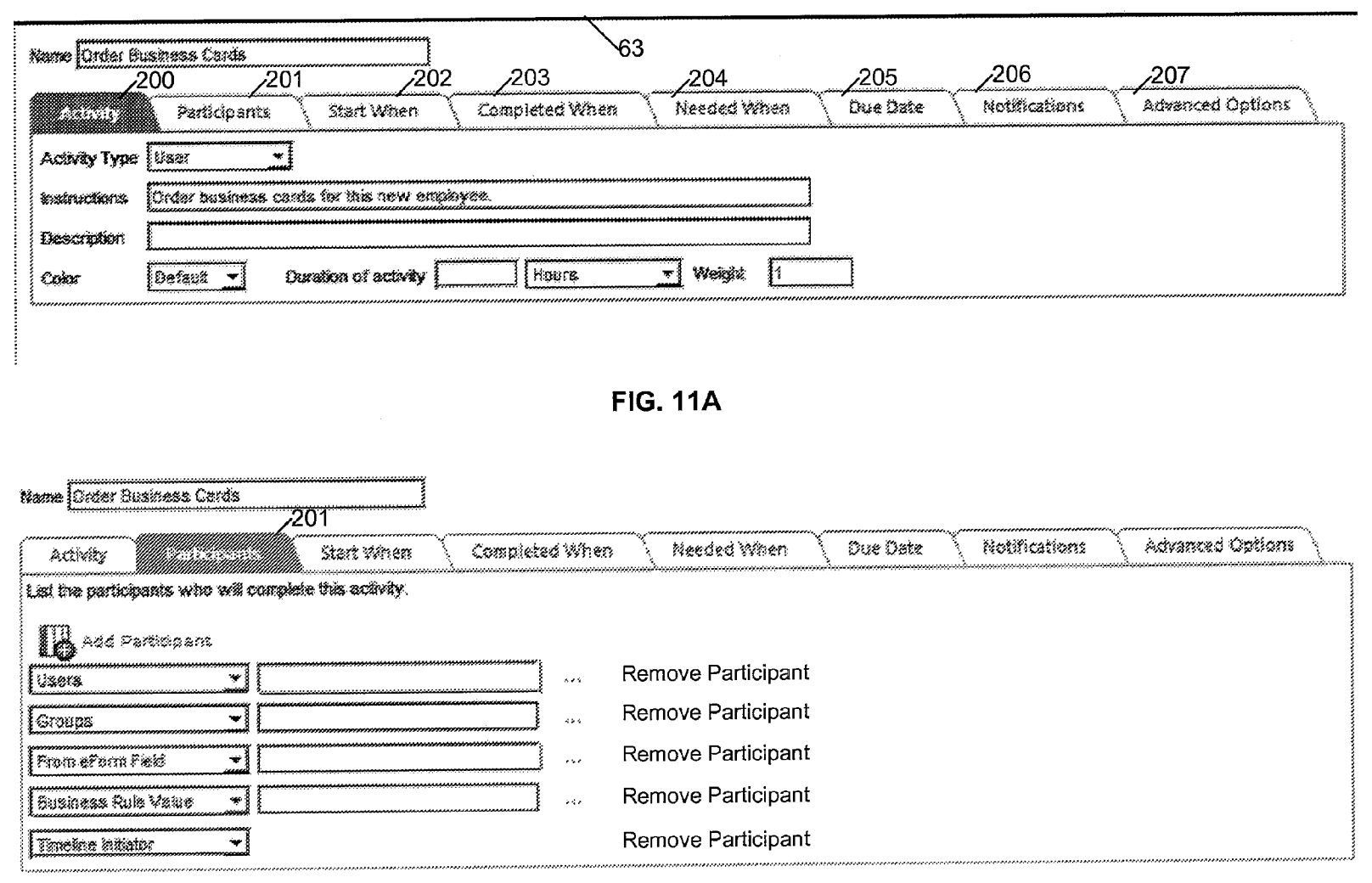

FIG. 11B illustrates the pop up window or user interface corresponding to selection button 201 "Participants", and allows the administrator to enter participants or users to be assigned to the activity (step 66). The assignment can include groups, data on a form field, the result of a business rule, and a definition of the process initiator.

Figure 11C:
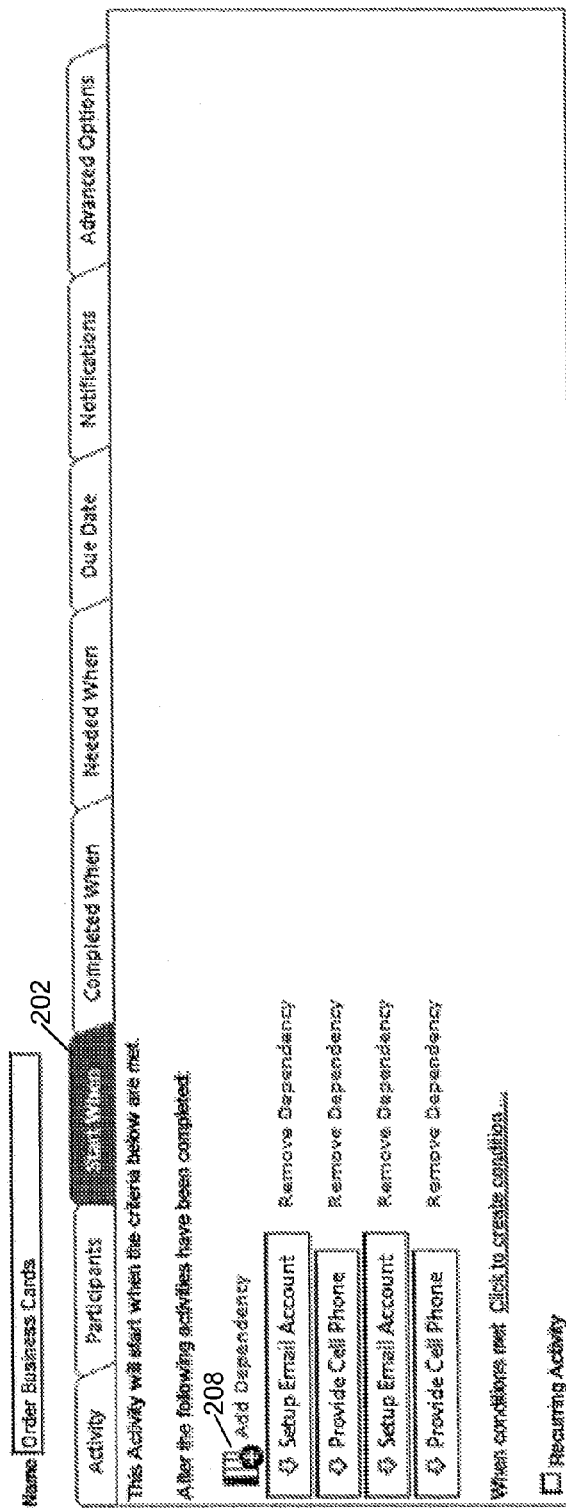
FIG. 11C illustrates the next activity defining user interface used for entry of any dependencies on other activities before the activity can be started.
Figures 11D, 11E:
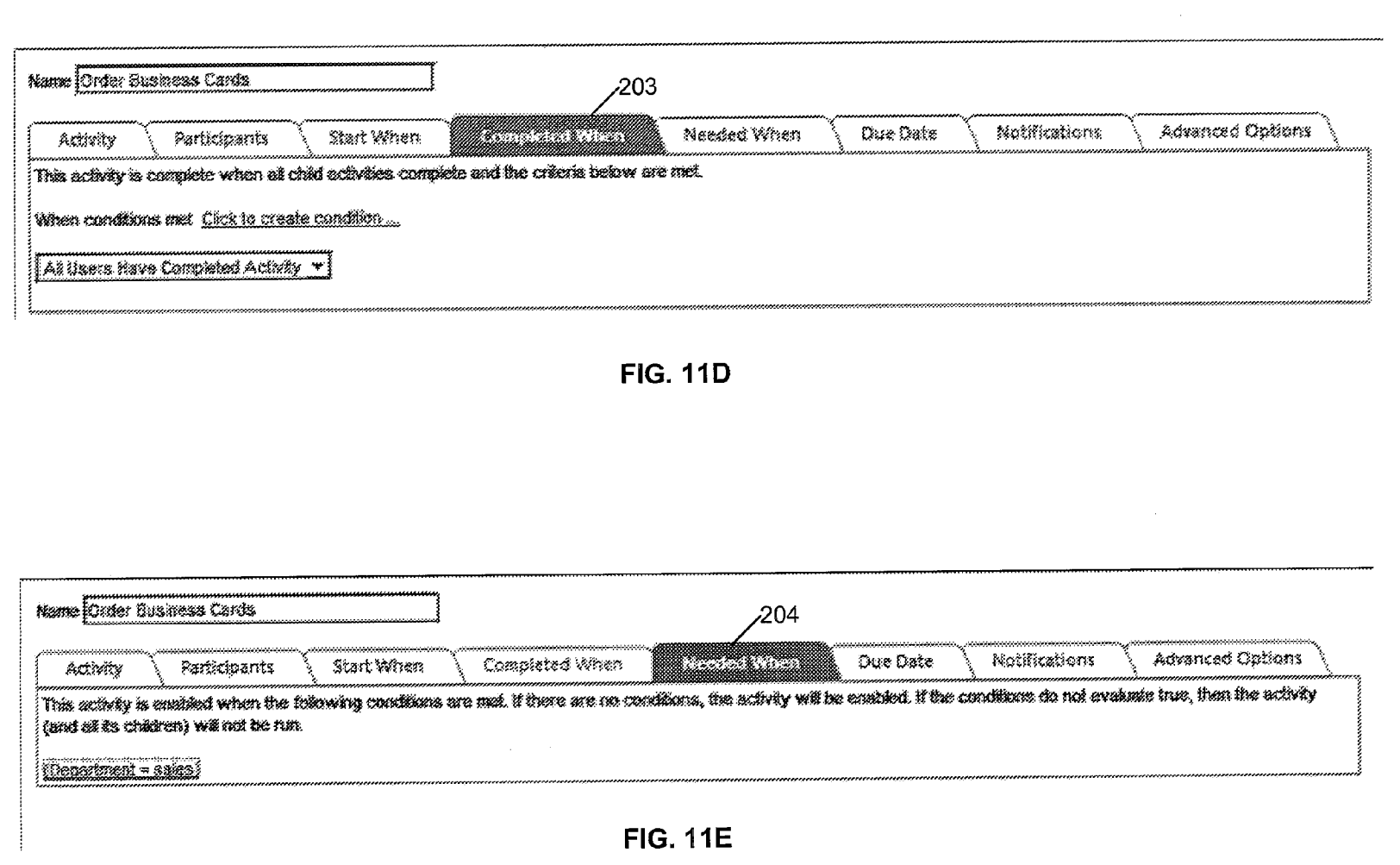

FIG. 11C illustrates the pop up window which appears when the "Start When" button 202 is selected. This allows the user to enter the dependencies for this activity (step 68). Here, the user has specified that the activity "Order Business Cards" requires completion of the activities "set up email account" and "provide cell phone" before it can start, for example. Any number of dependencies can be added by the user in this window, by clicking on the button 208 labeled "Add Dependency". Dependencies can also be removed by clicking the appropriate tab or button. FIG. 11D illustrates the pop-up window or dialog for the button "Completed When", which is used to define conditions to be met before the activity is considered completed (step 70). Conditions can be defined here which determine when this activity should be terminated, such as "All Users Have Completed Activity". More than one condition can be entered in this window, including what action to be taken if the due date for the activity has been passed.

The dialog or pop up window of FIG. 11E corresponds to the button "Enabled When" and allows a user to enter conditions indicating when an activity is needed and should be started or enabled (step 72), for example when a new employee is checked. If the enabled condition is not met, an activity instance is created to satisfy any dependencies, but the activity is not run. If no conditions are entered, the activity is automatically enabled and can be started when any activities on which it is dependent are complete.

Figures 11F, 11G:
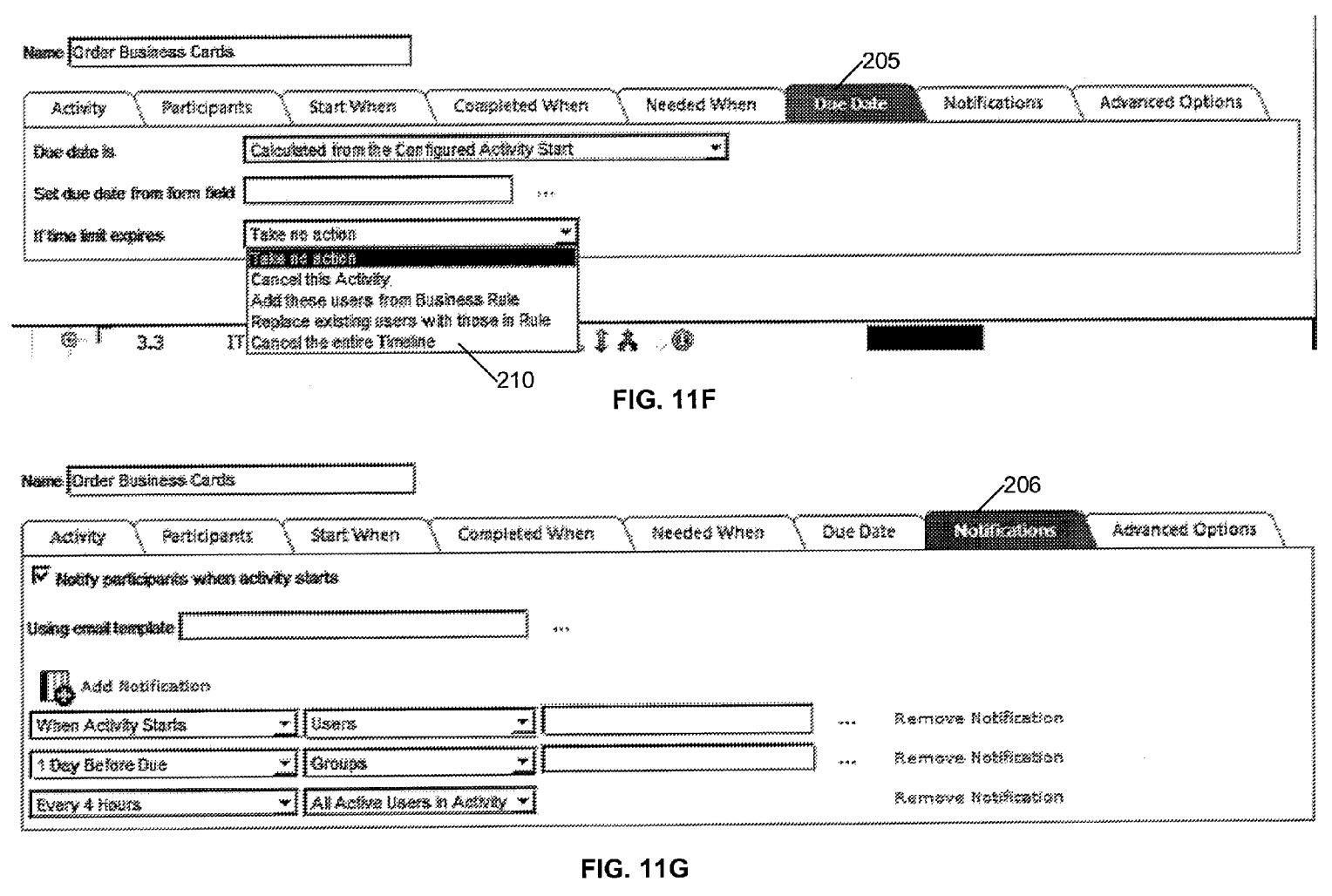

The pop up window of FIG. 11F defines a due date for an activity and is displayed when a user selects the button 205 labeled "Due Date". The user can enter a deadline for completing the activity (step 74), which determines the amount of time this activity has to complete. The definition defines the expected duration and due date of an activity. At runtime the system uses this information and the actual amount of time past instances of the same activity took to complete to calculate a start date and duration of future activities. This information is used to control the display of the activity time line in the project definition screen and the running/completed project instances (via the Gantt chart). In this window, the user also defines any action to be taken if the time limit expires after expiry of the deadline. These actions are revealed on a pop up window 210 when the user clicks on this option, and may include "Take no action", "Cancel this Activity", "Add/Replace Users", "Email Reminder", and so on, as seen in FIG. 11F.

The pop up window of FIG. 11G allows entry of notifications to be sent to participants at predetermined times, for example when the activity starts, and at different time intervals. An activity notification can be sent to any number of users. This can include groups, users, users specified on a form field, users determined by evaluation of a business rule, and the project initiator or administrator. The timing of the notifications can also be selected, such as one day before due, or repeatedly at specified time intervals. The administrator can also select an email template or an e-form to be used for the notifications. The user is also provided with the ability to enter other less used options (step 76), by clicking on the button 207 "Advanced Options", which activates the pop-up window or user interface of FIG. 11H. Some of the examples are showing errors in reports in certain situations, and selecting whether or not the activity is required in order to complete the parent. An e-form can also be selected for the activity in this pop up window.

An activity can have conditions defined that determine when it should start, when it can end, and if it is needed. The conditions are created using a graphical interface to create the complex condition set, and examples of the graphical interface are illustrated in FIGS. 12 and 13 for the activity "Order Business Cards" and "Grant VPN Access," respectively. Conditions can include queries against form data, status of other activities, result of other activities, etc. This allows a series of Boolean operations to be performed against data in the running process. This data includes the eForms or provisioning forms attached to the process, the process information, user information, and system information. For example, one condition for starting the activity "Order Business Cards" is receipt of a new hire requisition approval form (see FIG. 12). For VPN access to be granted, the box "VPN Access" on the provisioning form must be checked or the new hire must be for a position which always has VPN access, such as the hiring manager.

Once all the definitions, instructions, participants, dependencies, deadlines and conditions for an activity are entered and saved to memory, if there are any other activities to be defined (step 78), the user clicks on that activity in order to reveal the first pop up screen in order to enter the activity description and instructions (step 65), and the preceding steps are repeated using the pop up forms for the next activity. Once all activities are defined, the project definition is complete (step 79) and is saved to memory in the form of the tree structure 240 of FIG. 2.

The user input interfaces allow users to easily route electronic forms in accordance with defined business processes, minimizing the need for handling paper, decreasing the need for manual routing, eliminating errors and reducing the lifecycle of mission-critical forms processing. The system allows users to pre-populate eForms, make changes to isolated sections of the form, automatically kick-off a review and approval cycle, instantaneously track and audit all tasks involved with that form and execute changes automatically (once all approvals have been obtained). In one embodiment, eForms processing includes the following:

- A 100% web-based platform—no client software required
- Form fields can be linked to external databases
- Real-time validation of input data
- Automatic form field pre-population
- Forms dynamically controlled through rules-based business logic controls
- Forms that can be easily built using Microsoft (MS) Word or with existing MS ASP.NET (application server page) tools
- Dynamic presentation through AJAX-enabled eForms
- Seamless integration with the core document management system
- Electronic signatures and detailed auditing for approvals.

An eForm (electronic form) assigned to an activity in a process is displayed inside a user browser as a web page in HTML (hyper text mark up language) and has a series of controls that can display or prompt a user for information. The eForm is an important part of the timeline processing in this system because the activities use this information inputted from a user on the eForm to make decisions. Electronic forms or eForms for a process are created by the system using e-forms module 17 based on input from an administrator when the process is first set up. Normally, .NET HTML forms are created using .NET editing applications such as Visual Studio. These tools are typically technical in nature, and require technical knowledge which a business process administrator may not have. Module 17 in one embodiment is configured to allow a less technical person to create advanced eForms from inside of MS Word with the help of a custom ActiveX control, as described below. The end result is a .NET HTML form. ActiveX is defined by Microsoft as a way to interface and extend their applications (e.g. MS Word, Internet Explorer). ASP.NET is a Microsoft standard for creating web pages.

In one embodiment of eForms module 17, eForms are created in MS Word using a custom ActiveX control as mentioned above. In this eForm creation process, the following steps are carried out:

1) The form is created in MS Word using a MS Active X plug-in. The custom ActiveX control provides a graphical interface allowing a user to configure controls and information on an eForm. The ActiveX control is saved in the MS Word document. The configuration data associated with each ActiveX control is streamed into the MS Word document and saved.
2) The form is then saved, and the plug-in converts the MS Word document locally to HTML (hyper text mark up language). This is a capability that exists within MS Word. The custom program is automatically invoking this to create the HTML transparently to the user creating the eForm. This occurs automatically when the MS Word document is saved and the user indicates they are done editing.
3) The local HTML document is updated to replace the configuration stored in Active X controls with text "tags" representing each control on the form configured by the user. In this step, the HTML file is modified to insert "text" using the ActiveX configuration data stored in the MS Word document. This is required because the HTML file supports only text strings (e.g. HTML). The text inserted contains special keywords with the configuration data parameterized in the strings. This technique allows the configuration information entered by the user to be transferred to the server, embedded within the HTML.
4) The HTML document and all supporting files are uploaded to the server (images, style sheets, etc.) and stored in the data base. All files are transferred to the server using Web Service API calls. This occurs automatically when the MS Word document is saved and the user indicates they are done editing.
5) The server side processing updates the HTML file and replaces all local references to embedded images/style sheets with a URL pointing to the new location of the images/style sheets stored on the server database. Server side processing replaces all references to local files (e.g. images) with HTTP (hypertext transfer protocol) links to files now stored on the server data base.
6) The server side processing converts the HTML file into an ASP.NET standard file type filename.ASCX. This is created by pre-pending and appending ASP.NET specific text into the file. The HTML file is converted to an ASP.Net standard ASCX file. The ASCX file is stored on a server cache for dynamic rendering to a user.
7) When the user opens the eForm, it is rendered on the server as an ASP.NET form and displayed in the user's browser as an HTML web page.

Once the process is completely defined in the manner described above, the process automation module 15 may start operation according to state machine logic, as described in more detail below in connection with FIGS. 16 to 18. Pop up windows or eForms as the process is running also allow users or participants in a task or activity to enter outcomes or results by selecting an appropriate "Results" option on the main project screen of FIG. 7. Buttons are automatically displayed on each eForm based on the "results" that are defined to the activity. An eForm displayed to an end user participating in a task includes buttons based on the possible branches or outcomes that result from an activity/step. If an activity has two possible results named "result A" and "result B", they are automatically displayed on the eForm for that activity. This is not limited to two "outcomes"; there can be any number of results of an activity. When the user selects the button, the associated result is recorded in the running instance of that activity indicating their choice. This choice is used along with the configuration of the step/activity to determine if the step/activity is completed and which path to take. For example, if a single user is assigned to a step in a workflow having possible branches "Result A" and "Result B", and they choose "Result A", the workflow proceeds down the path associate with that result (button). A "Cancel" button is also displayed in case it is needed, for example when the user has selected an eForm in error.

Figure 15A:
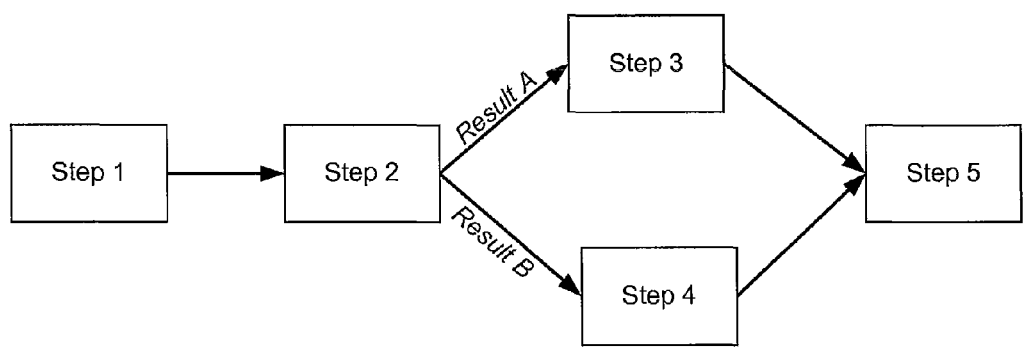
FIG. 15A illustrates a conventional workflow definition with result-based steps.
Figure 15B:
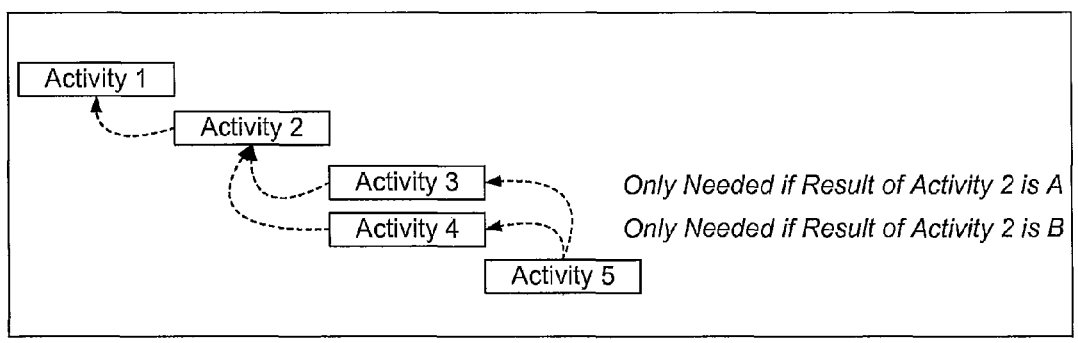
FIG. 15B illustrates an activity based workflow definition with activity result based activities.

FIGS. 15A and 15B illustrate the difference between a conventional workflow definition to a repeatable business process with different possible outcomes/results (FIG. 15A) and the automated business definition based process as described above (FIG. 15B). With a conventional workflow definition or approach, step 1 is followed by step 2, then step 3 if the result of step 2 is A, and step 4 if the result of step 2 is B, then step 5. In the activity-based automated business definition system and method described above, activity 2 can start when activity 1 is complete, activity 3 is only needed if the result of activity 2 is A, activity 4 is only needed if the result of activity 2 is B, and activity 5 can start after activity 3 or activity 4 is complete (FIG. 15B).

Figure 16:
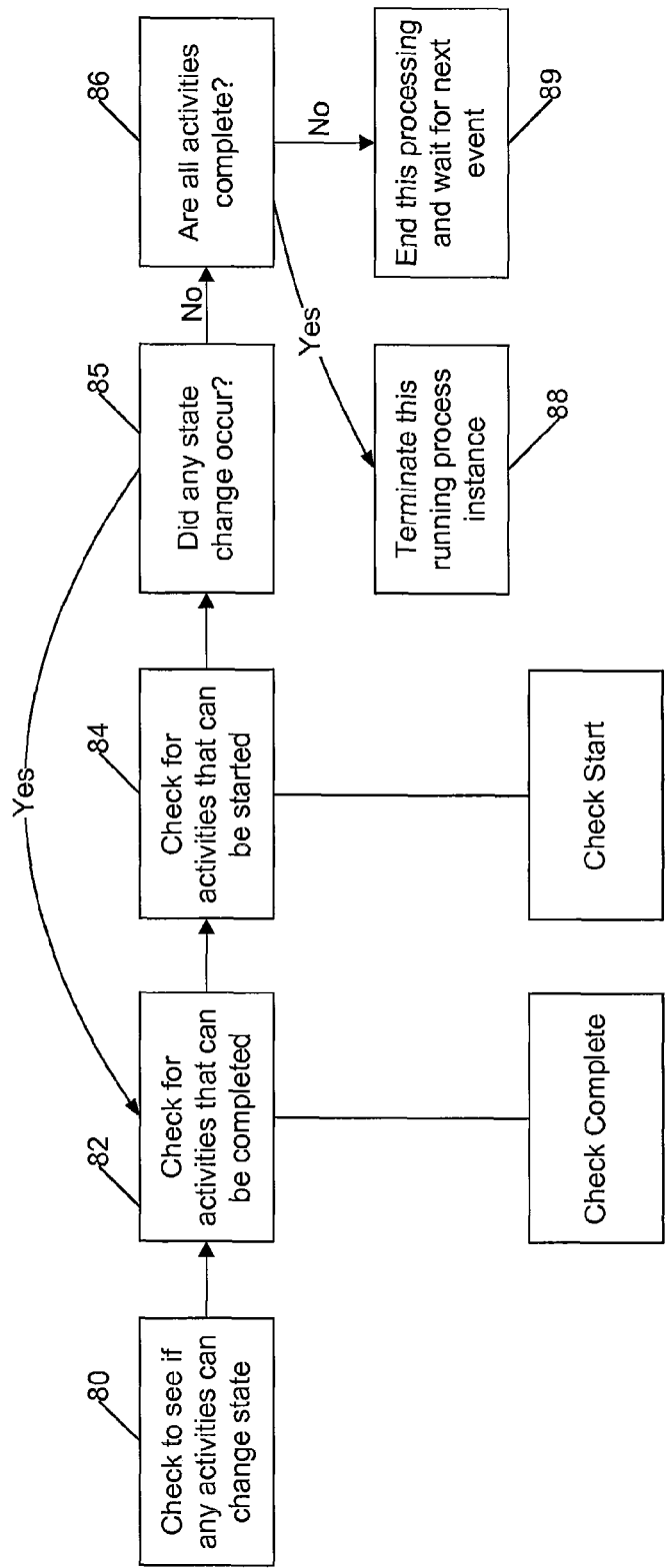
FIG. 16 is a flow diagram of one embodiment of a method for monitoring and updating activities in a process definition after start of the process or project.

FIG. 16 is a simplified view which illustrates one embodiment of an activity based method of automating a business process or project after it has been defined as described above and the automation module 15 has processed all the user entered information to create an activity based timeline or tree structure 240 as illustrated in FIG. 2 and described above. FIG. 16 illustrates the main loop or "CheckForAdvance" routine of the state machine logic. It can be initiated with any user activity that could result in a state change and during recurring timer checks. This routine continues looping until no additional state changes occur. A state change is defined as any activity that goes from active to inactive or inactive to active, or a change to the duration or due date. If there are activities that can change state (80), a check is made for completed activities (82) (See CheckComplete procedure described below) prior to checking if activities can be started (84), because of the nature of the dependencies. Since many activities are dependent on other activities, they cannot start until those activities are completed. Therefore checking for activities that can be completed first increases the likelihood of an activity being able to start. Once the CheckComplete procedure is finished, the CheckStart procedure is started at check 84. Once both the CheckComplete and CheckStart procedures are complete, the main loop or routine checks if any state change has occurred (85), and returns to step 82 if a state change is found. If no state change has occurred, and all activities are complete (86), the running process instance is terminated (88). If there are still activities which are not complete, the processing is ended and the main loop waits for the next event (89).

The Check Complete and Check Start procedures or activities are described in more detail below. The "check complete" or CheckComplete subroutine which results from node or event 82 of FIG. 16 checks to see if each activity which is still incomplete can be completed.

CheckComplete(node)—This checks to see if an activity can completed. The system first checks all sub-activities under the parent activity to see if they can complete. An activity can be completed if its configured conditions are met. The conditions that define when an activity can be completed include whether users are running (and how many), and if its due date has passed. For each child in the parent node call CheckComplete(child_node)—this is a recursive call to traverse through the tree structure (FIG. 2). This is a traversal of the tree structure to check the state of the lowest nodes first and then work back up through the parent nodes.

CheckComplete(child_node) procedure:
If this activity is not running, return.
Loop through each child of this activity in the tree and see if they are still running, if so then this activity cannot complete.
Check if the participants are all done, if not, this activity cannot complete.
If the checks above indicate this activity cannot be completed, check to see if the DUE date is met and if so check to see of the action indicates this activity should be cancelled, if so, then we force this activity complete.
If there is no reason to keep this activity running, complete (terminate) the activity now, using StopActivity(node), and return.

Figure 17:
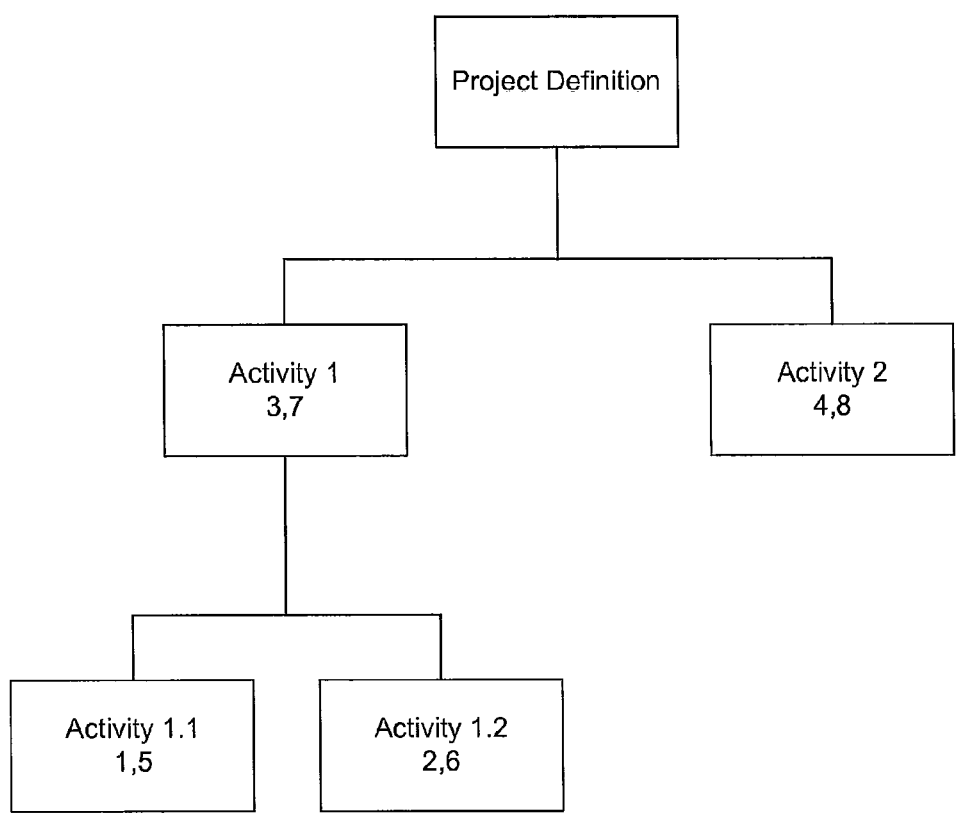
FIG. 17 illustrates an example of an activity tree used in checking whether sub-activities under a parent activity exist which can prevent or delay activity completion.

FIG. 17 illustrates the order of checking activities in a CheckComplete subroutine for a project tree having two parent activities, Activity 1 and Activity 2, with Activity 1 having two sub-activities or child activities 1.1 and 1.2, and Activity 2 having no child activities. In this case, the order is as indicated in FIG. 17. First, Check child activity 1.1, second, Check child activity 1.2, third, Check activity 1, fourth, Check activity 2, and then repeat in the same order at the next timer check or state change (Checks 5 to 8). Regardless of the number of sub-activity levels in the tree, each activity in the lowest child activity level is checked in turn before proceeding up the tree to the next level, and so on until the parent activity level is checked.

Once a "CheckComplete" subroutine is completed, the main loop of the state machine proceeds to check for activities that can be started (84) in a "CheckStart" subroutine, as described below.

CheckStart(node)—This checks to see if an activity can start. It checks the activity conditions (e.g. dependent activities), as follows:
  If a pending activity instance exists (or no activity instance exists) then see if we can start this activity now.
  Check dependent activities for this activity. If any dependent activities are still running this activity cannot start.
  Check the start condition for this activity, if a condition exists and the condition is not met, this activity cannot start.
  Check the enable condition for this activity, if a condition exists and the condition is not met, this activity is not needed. Create an activity instance (if required) and set the status to completed and the termination reason as "not needed". This is required so that other activities that are dependent on this activity can now run.
  If we cannot start this activity, exit this function.

StartActivity(node) is used to start an activity if it is determined that the activity can be started based on the results of the CheckStart function. This uses the following steps:
If the activity is running, traverse through all children of this activity and try to start them. For each child in this node call CheckStart( )—this is a recursive call to traverse through the tree structure. This is a depth-first traversal that processes the parent nodes prior to the children. It attempts to start the parent node, and if started, it continues traversing through the children.

Starting an activity using the StartActivity routine may involve starting user activities and assigning tasks to those users in their task lists, for example, and sending them emails instructing them to complete activities, or a programmatic (non-human centric operation) like attaching a document, executing a workflow process, or calling a script function. This also updates the memory structure and the database with the updated status. StopActivity(node) is a routine to stop an activity if it is found that the activity is not needed in the CheckComplete routine. This may involve removing user tasks. This updates the memory structure and the database with the updated status of the activity. The StopActivity updates the Timeline Definition on database every time an activity completes. When the activity completes normally it increments the number of times the activity has run and recalculates the average time this activity takes, and updates the definition on the database.

The software or state machine of the above embodiment uses the following logic rules:
  If an activity is a dependency and it is not enabled (i.e. the activity is not needed based on the condition), then the dependency is satisfied.
  If a parent activity is not enabled (not needed based on the condition), none of the children are enabled/needed.
  There is a "restart activity" and "restart activity with rollback". The rollback will cancel all dependent activities.

The "restart" will simply restart an activity. Only new activities will use the new activity instance for a dependency condition.

There is a "cancel activity". The cancel acts like a normal completion and causes the activity to satisfy any that reference it as a dependency.

Recurring activities are supported. A recurring activity can be repeated on an interval. Any recurring activity under a parent activity will not be used in the reporting on the parent activity. If already running, then do not start another activity . . . just leave running There is an activity instance record that is created every time the activity runs.

Buttons are automatically displayed on the eForm based on the "results" that are defined to the activity. These buttons are only visible to users that are assigned the task associated with this activity.

As the process is running, status data is collected and stored in memory and also used by the reporting module which is programmed to create various reports available to users on request, for example by clicking on an option available in a pop up options menu on the project definition page. Two example reports are illustrated in FIGS. 18 and 19. One option is a project status viewed from a timeline perspective or Gantt view, as illustrated in FIG. 18. This provides a view of all the activities, showing when they started and ended (and when they were supposed to start and end based on the definition). This view displays each activity in relation to all of its dependent activities. Each activity displayed shows when the activity was supposed to start and end (based on the project definition) and when the activity really did start and end. This interface is also used to administer a running process, allowing activities to be cancelled or restarted. Users can be added, removed, or reassigned on running or pending activities.

The timeline BP1 can be changed by the user to display the duration in another interval. For example, the user can change the current view to display the timeline in days, business days, hours, weeks, or months.

The colors and styles can be configured by an administrator, but the following defines the default colors and style of the product in one embodiment:

The vertical bar 110, which may be green or any other selected color, shows the current date/time overlaid on the project.

Each horizontal bar represents an activity (or a collection of activities if the item is collapsed).

The horizontal bar has three fillings, solid (112) indicates the portion where the activity was running, lightly shaded (114) indicates the difference between the running portion of the activity compared to where it is projected to be completed, and no color (115) indicates the activity has not started.

A red line surrounding the bar indicates the activity is late.

A yellow line surrounding the activity indicates the activity is predicted to be late based on the current information and the past performance of this activity in previous executions of this process (an example of this prediction process is illustrated in FIG. 21).

A triangle 116 in a first color (e.g. green) indicates where an activity is projected to start based on the project or process definition.

A triangle 118 in a second color (e.g. red) indicates where the activity is projected to complete based on the definition.

Figure 18:
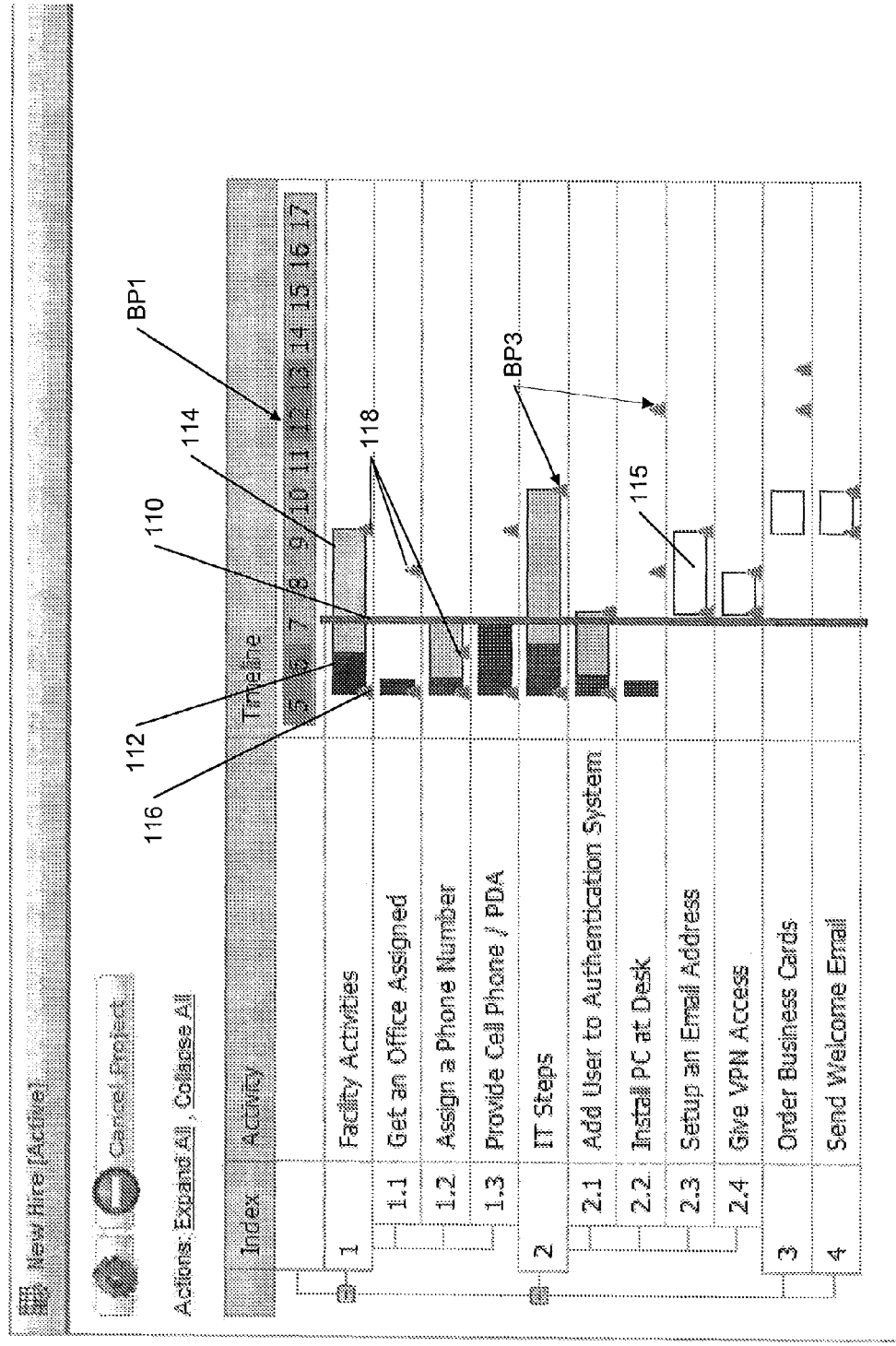
FIG. 18 illustrates one example of a project status Gantt report generated by the activity based workflow automation system of FIGS. 1 to 10 and 11B to 14, and 15B to 17.
Figure 19:
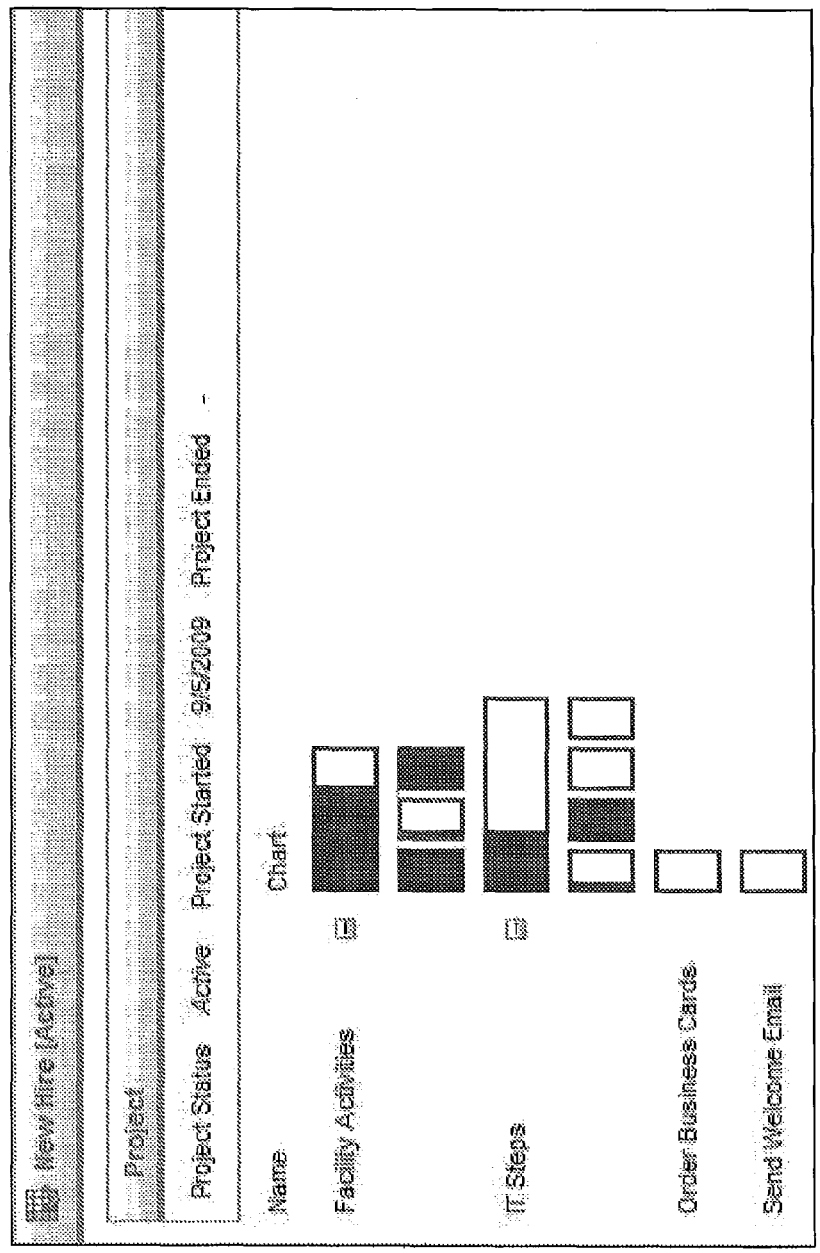
FIG. 19 illustrates an example of a weighted project status report generated by the activity based workflow system of FIGS. 1 to 10 and 11B to 14, and 15B to 17.

Thus, in the example of FIG. 18, Activity 1.2 is late, but all other activities are on time. This allows the user or project manager to easily check the status of an ongoing business process or project and to follow up on any activities that are projected/predicted to be late.

The end date of an activity's horizontal bar BP2 can be moved with a mouse through a drag and drop. This changes the expected duration of the activity, which in turn causes all dependent activities to be re-evaluated and re-drawn on the GUI. This allows a "what if" analysis to occur so an administrator can see the projected impact of a change in an activity's duration.

The triangle that represents the due date BP3 can be dragged and dropped to a new point in time. This moves the due date and changes the expected duration of the activity. This also causes all dependent activities to be re-evaluated and their corresponding due dates to be re-calculated and re-drawn on the GUI (graphical user interface).

The report module also creates status charts based on activity weighting, so that project status can be viewed from a "weighted" perspective, as illustrated in the example of FIG. 19. An activity weight is used to indicate the relative "importance" of an activity within the scope of the project. An activity's weight is combined with its children's weights for its complete weighting. This shows the activity status based on an aggregate view of all the sub-activities. Each weighted activity has a percent complete. 0% complete means the activity and all of its children have not started yet. 100% complete means that the activity and all of its children are complete (finished). To calculate the percent complete and weights, the following formulas are used for each activity:

Configured_Weight=Weight of this activity defined by administrator

Children_Weight=Sum(Actual_Weight of all direct children)

Actual_Weight=Configured_Weight+Children_Weight

User_Percent_Complete=(Num_Complete_Participants/Num_Participants)*100

Children_Percent_Complete=Sum((child_Actual_Weight/Children_Weight)*child Actual_Percent_Complete of all direct children)

Actual_Percent_Complete=(Configured_Weight/Actual_Weight)*User_Percent_Complete+(Children_Weight/Actual_Weight)*Children_Percent_Complete For example, an activity with Actual_Weight of 8, with 2 child activities each of weight of 2, each 50% complete, would have an Actual_Percent_Complete of 25%. The weights and percents complete are displayed graphically in this view. Additionally, each Activity can be expanded to show the child activities under it. Each child activity can also be expanded to any underlying layers of grandchild activities, and so on for any required numbers of layers or levels of activities.

The weighted activity report of FIG. 19 shows a bar representing each activity or the collection (aggregate) of activities under a parent activity. The solid color indicates how much of the activity is complete. The area that is not filled shows the portion of the activity that is not completed. A red line around an activity indicates that the activity is late. The level of completeness is defined by the weighting (defined above) and how many sub-activities have been completed under a parent activity, or how many users (or workflow steps) have been completed for an individual activity.

The weighted activity report provides an aggregate status available across multiple processes/workflows, which is not purely timeline based, but instead is based on a weighting of the individual activities in the project and their status. This allows a unique perspective of running workflow processes and a way for administrators to define key performance metrics that are used in graphing/reporting on the status of each activity. This gives a high level view, based on past activity of the processes, of which activities are the bottlenecks, or which are consistently late. The weight of an activity is defined in each activity in the Project Definition. This weighting is relative to the other activity weights (within the activity tree structure).

The reporting module may also be programmed with the ability to provide predictive analysis of running activities and processes. The system provides reports on a running process and can predict if a future activity is going to be late based on the definition of the activities (e.g. expected duration, dependencies, etc.) and the past performance of prior activities (in prior examples of equivalent processes), for example as described in more detail below in connection with FIG. 21. The "predictive" logic uses information from the past instances of processes and activities associated with the processes to calculate the average time that each activity has taken to complete in the past and uses that information to determine if a future activity may be late. Each activity is configured with duration and dependencies on other activities. This determines the timeline of the project/process (using relative dates/times). When a process is running, the application can determine what future activities are likely to be late by using the average time to complete (in the past) with the dependency configuration and extrapolating out when a activity should start based on where it is now. Knowing when an activity is expected to start provides the basis to determine if the activity might be late (using the past performance of the activity, not the configured duration).

The process and activity definitions are stored in separate database tables from the running instances of a project (and the associated activities). The database tables contain the configuration and execution information for processes. This structure allows for minimal data to be duplicated between the definition and the running instances. This also provides the foundation for the 'real time' changes that are allowed with the product. Every state change causes the definitions to be referenced for the most current configuration. This enables changes made to a definition to be carried out instantly when the next state transition or evaluation occurs.

The database or configuration tables are structured to store configuration information separately from the running processes (instances). The project definition contains the configuration information. This includes each of the activities. The type of data includes:

Activity Name
Instructions for the users assigned to this activity
Duration of activity (which is used to compute the due date which can be defined in hours, days, business days, weeks, or months)
Activity weighting (to indicate relative importance of this activity in relation to others)
The average time this activity takes (recalculated each time an activity completes).

The project instance contains the running information. This includes each of the activities. The type of data includes:
Status (project, activity and users)
Start & End times
The users who were assigned to the activity
Results of activities, which appear as buttons on the screen with appropriate indicia as described above.

The data base tables for project definition and project instance may include the following activity types:
User—user activity with conditions that determine how many users must complete, what choices they can make, and what constitutes this activity as being completed.
Attach—this attaches an object in the content database to the process
Script—this allows a custom script to be run
Custom Task—this allows custom scripts to be packaged into a reusable module with configuration parameters that can control the processing of the custom code.
Meta Data—used to set the project "package" and all the contents to the meta data specified (this is either configured on the activity or it can take meta data from the form instances and apply that to the project data.
Form—used to attach a new eForm and to change the current form viewer of the project.
Process/Workflow—this starts the workflow or project configured with this activity.
Notify—email notification only to users known to the system to external users.
Branch—this will jump to another activity in the process.
End—this will end the Timeline process.

Figure 22:
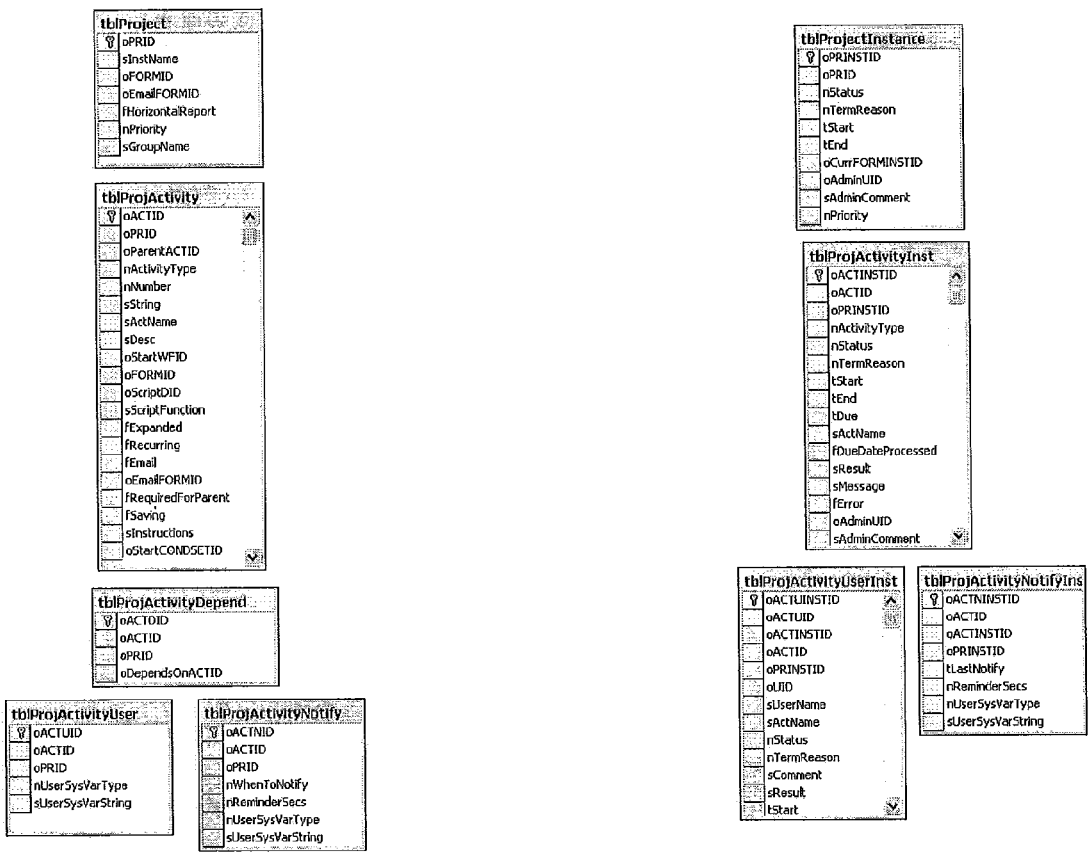
FIG. 22 illustrates an example of configuration tables and instance (execution/running tables) which may be used in one embodiment of the method.

FIG. 22 shows an example of configuration tables (left hand side) and instance (execution/running) tables (right hand side) as described generally above.

The configuration tables illustrated on the left hand side above are described in more detail below:
tblProject—This contains the project definition configuration. There is one record per project definition.
tblProjActivity—This contains the configuration information for an activity. There is one record for each activity in a project. A project activity "points" to it's parent activity in this project. The tblProjActivity record points to the tblProject record.
tblProjActivityUser—This contains the user configuration for each activity. There is one record for each participant in an activity. A participant can be user(s), group(s) or based on rules. The tblProjActivityUser record points to the tblProjActivity and tblProject records.
tblProjActivityDepend—This contains the dependencies for the activities in a project definition. Every dependency has a record that contains the configured activity and the activity that it is dependent on.
tblProjActivityNotify—This contains the activity notification rules.

The Instance tables (execution/running) shown on the right hand side above are described below:
tblProjectInstance—This contains information about a running instance of this project definition. Each time a project (process) is started a new record is created with information about this occurrence.
tblProjActivityInst—This contains information about the running or completed activities in a project. Any time an activity starts a record is created with information about this running occurrence. Until an activity starts, no "instance" record is created. The exception to this is during administrative functions, e.g. when a workflow administrator changes the properties of a future activity, a record with a "pending" status is created with the changes. Changes to properties include changing the due date, duration, or the users that are configured to be assigned to this activity. The tblProjActivityInst record points to the tblProjectInstance record.
tblProjActivityUserInst—This contains information about the running users in an activity. This only contains user information. A tblProjActivityUser configuration record is evaluated when an activity starts and all users that are defined to that configuration record are expanded out and create an instance record for each user. For example, if the tblProjActivityUser is configured to assign the task to "group A", and that group has 2 users, two tblProjActivityUserInst records are created (one for each user). The tblProjActivityUserInst record points to the tblProjActivityInst and tblProjectInstance records.

tblProjActivityNotifyInst—contains information on activity notification and reminders to users.

Figure 20:
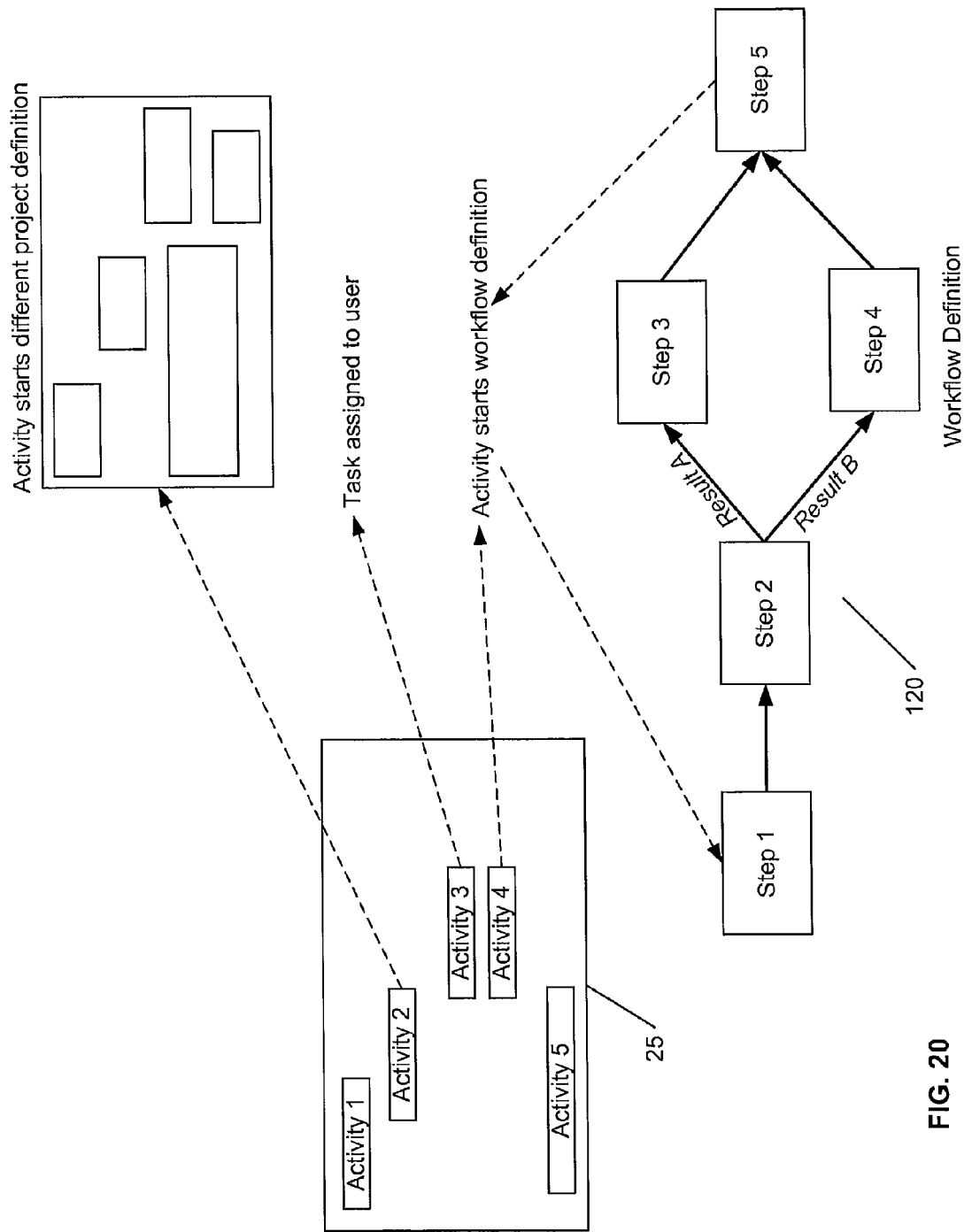
FIG. 20 illustrates a project definition based workflow automation process in which an activity includes execution of a flow-based workflow.

FIG. 20 illustrates an embodiment of an interaction between the activity based workflow definition in a project management system and method as described above in connection with FIGS. 1 to 19 with a more conventional flowchart like workflow definition. In the embodiment of FIG. 20, one of the activities (Activity 4) in project definition 25 initiates a flowchart oriented workflow definition 120. When that workflow is complete, that activity is complete. The workflow can return a value that will set the result activity, which can then be used in conditional processing of other activities. In the example of FIG. 20, activity 3 assigns a task to a user, and activity 2 initiates a different workflow definition.

The timeline or project definition becomes the coordinator of many workflows that make up the entire process. This allows the timeline to run different workflow processes at the appropriate times based on the configuration of the dependencies and rules that define the condition under which the activity is to be run. One possible example of a situation where the non-linear, activity based project definition may include one or more activities which involve flowchart oriented steps is described below. In this case, the project is a new hire (an oversimplified snippet of a typical new-hire onboarding process), and a simplified activity based project definition for this project or process is outlined below.

1.0 Facility Activities
   1.1 Get an Office Assigned
   1.2 Assign a Phone Number
   1.3 Provide Cell Phone/PDA (condition: only if Sales)
2.0 IT Steps
   2.1 Add User to Authentication System
   2.2 Setup an Email Address (dependent on 2.1)
   2.3 Install PC at Desk (dependent on 1.1)
   2.4 Give VPN Access (dependent on 2.1, condition: only if working from home)
3.0 Order Business Cards (dependent on 1.0 and 2.2)
4.0 Send Welcome Email (dependent on 2.3)

In this scenario, users or groups may be assigned to the activities. Activity 2.4, i.e. Give VPN access, may be a simple activity that is assigned to a user to setup VPN access and the user indicates when the activity is complete. However, this could involve a more complex approval process to simply get VPN access. In one example, completion of this activity may require some approvals and then an assignment to an individual to make the necessary change. So instead of "2.4 Give VPN Access—assigned to Bob", this activity could be defined as follows:

Give VPN Access=start workflow "VPN Approval Access", where "VPN Approval Access" is a workflow (flowchart) like:
IT Director Approval ("Sue")→Compliance Officer Approval ("Sally")→Make VPN configuration change ("Bob").

There are other examples of activities which might involve workflow (flowchart)-like activities which can be defined in a similar manner when setting up the project definition. In one embodiment, the activity based process management system and method described above may be integrated or built on top of an existing, conventional workflow (flowchart) based system, for example Workflow Director v2 (February 2009) manufactured by BP Logix, Inc. of Vista, Calif.

The activity based project or process management system and method described above provides users with the ability to model workflow processes through a project management interface (e.g. project plan, Gantt chart). Existing workflow and BPM products model processes using various techniques, but ultimately they all generate a process that is represented by a "flowchart". The activity-based system described above allows workflow processes to be defined in a project management framework (in a PM-like interface). The business process is then controlled and automated through an internal state machine that starts activities. Activities can be assigned to users or start structured workflows based on the definition of the activity. Unlike project management applications, this can be used for repeatable processes and is defined using relative dates/timelines (for automation purposes). Once a project is started all the activity timelines are converted to absolute dates/times.

The software used in the above system provides the ability to associate traditional BPM/workflow attributes with individual activities within a project management framework and automate that process based on the project definition. This is an "activity based BPM model" vs. a more traditional "flow-based BPM model". Activities are normally assigned to individuals or groups of users. This system also allows for an activity to start a more traditional "flow-based" workflow process (Workflow Definition), as described above in connection with FIG. 20.

The reporting module or software provides the ability to report on the status of an automated workflow process through a Gantt chart interface. The software uses a Gantt chart interface to report on the status of a workflow instance including the overlay of the activities on a timeline. Other types of reports available in the above system include an aggregate status report which is based on the weighting of individual activities in the project and a predictive report that can indicate if future activities are likely to be late, based on previous stored data on similar processes.

The system and method of the above embodiments provides the ability for users to reassign users, alter of dates or durations, and update dependencies. Within the project management interface, an individual activity can be restarted. This automatically resets all activities that were dependent in this activity so they can be started again in the future (as required by their configuration). The product also has a unique configuration ability to automatically display the appropriate buttons on an electronic interface (electronic form) based on the configuration of a workflow process or activities. When using a structured workflow process, each "branch" leaving a workflow step has configuration information including a name. This name is automatically used on the button on the electronic form interface displayed to the user. Each activity can have future activities that are dependent on this activity completing. These future activities are used to automatically display the appropriate buttons on the user interface with the text activity name displayed on the button.

The system described above also provides the ability to give early notifications when an activity is predicted to be late. By keeping track of the past performance of all prior activities and using that information with the running state of the process, the start and end time of all future activities can be calculated (predicted). One example of a method or algorithm for predicting start/end dates and duration of future activities is illustrated in the table of FIG. 21. In this example, each time an activity is run, it is added to the total configured runs for that activity maintained by the system. Assuming that the configured time to complete an activity is T, Bucket 1 includes any runs which took <T−50% to complete, Bucket 3 includes runs which took >T+50% to complete, and Bucket 2 includes any runs which were completed in times between T−50% and T+50%. The user may select different times (i.e. with greater or less than 50% variation from the configured time T) if desired. In the illustrated embodiment, the configured or estimated time to complete an activity entered by the user is 10 days. The average time for the runs in each bucket is computed by the system on an ongoing basis. For example, in the example of FIG. 21, the average time for the runs in bucket 1 was 3 days, the average time for the runs in bucket 2 was 9 days, and the average time for runs in bucket 3 was 20 days. Although the times entered in FIG. 21 are in days, other time values such as hours, weeks, or months may be used in other examples, based on the overall project timeline and type of project. The user also enters a configured weight for each time bucket. The weight entered for the estimated time is typically low, while the weighting for the activities closest to the desired time period for an activity is higher. In this case, the relative values or weightings entered for Configured Bucket, Bucket 1, Bucket 2, and Bucket 3 are 1, 2, 5, and 2, respectively, although different values may be entered by the user in other examples. The weight for each number is then calculated using the following algorithm:

Calculated Weight=[# of runs/(total runs*2)]*Configured weight.

Using the numbers in the example of FIG. 21, this provides weights of 0.5, 0.2, 1.3 and 0.3 for each of the activity times in the running average column. The weight % by number of runs is then calculated in the next column, and the predicted time is then calculated in the final column by multiplying the weight % by the running average. The predicted time for a future activity to run is the total of all the times calculated in the last column of FIG. 21, in this case 10.4 days.

In one embodiment, the predicted time for an activity is determined not only on an activity level, but also on a user level. A single activity in a process may be assigned to different users or participants for different instances of the process. The expected or predicted activity duration can be estimated based on the user that is assigned to the activity in a current instance of the activity, using average times or durations for that particular user to complete the same activity in the past. Any predicted length of time for an activity may use all stored past instances for that activity, or only those stored for a particular user.

This allows interested parties to be notified (e.g. email, report) when an activity or set of activities are projected to be late, prior to the activity even starting. This ability allows a user to identify "critical activities" (or Key Performance Indicators—PKIs) to their business and allows them to report on or be notified of predicted exceptional conditions. It also allows a project manager to select a user based on their previous performance in carrying out a particular activity. Referring to the HR provisioning example described above, for example, this allows a hiring manager to indicate that they want to be notified as soon as the system detects that the activity called "install PC at Desk" is going to complete after the new hire start date (since they do not want the new employee to start without a PC at their desk). Users can choose different critical activities that they want to monitor and the condition that indicates a problem is going to occur. When a user has identified a critical activity and the difference between the start date and due date for that activity entered by the user is less than the predicted time for that activity to run, based on previous instances of that activity and the calculations in FIG. 21, the user is notified and can then make modifications as needed, for example by changing the due date, starting the activity sooner, assigning a different individual to carry out the activity, or the like.

In one embodiment, the software provides integration with Microsoft Project. This allows running processes to be exported into the MS Project format showing the status of the process in that application. Project definitions can be created automatically by importing a MS Project format that contains a list of activities/tasks.

Traditional BPM tools use various forms of modeling tool to "describe" the process to be automated. This definition (e.g. flow chart) is then compiled or rendered into a different format (internally) for automation. In contrast, the activity-based process or project management system described above automates the process based on the actual project plan defined. There is no "intermediate" format that is then used for automation. This allows real-time reporting, dynamic changes to project plans, etc. This is accomplished by having all running instances/occurrences of the project refer back to the definition on any state change.

Processes which may benefit from the activity-based process management system and method described above include business processes that require automation, tracking and reporting. Certain processes are well-suited to this activity-based approach, for example those that are not as well-defined, processes that are activity/checklist oriented, those where the project time-line is important, and those that are non-linear. Examples of processes in this category are HR on-boarding, IT provisioning, and sales order processing.

The above process management system and method fuses project management methodologies with BPM. Sophisticated business processes can be defined and automated through a project management style interface. More than just a new interface, the product is especially well suited for non-linear processes that cannot be easily represented in a flowchart. By fusing project management methodologies with BPM, users are provided with a tool that allows them to model processes the way they view them, as lists of activities with dependencies. Through this interface, users can define all the activities that comprise their business process, and simply identify any activity dependencies, just like a project plan, and the system is then automated based on an activity tree structure as described above. The process no longer has to be modeled in a flow chart or defined in a sequence; instead, the system automatically models, automates and graphically depicts the business process as a Gantt chart using the activity dependencies and durations.

This process management system allows a timeline to be created that describes the process. The past performance of these activities enables the predictive capabilities, notifying the appropriate users when an activity is expected to be last (prior to the activity even starting). The modular design of this system and method can allow businesses to easily and affordably deploy the product to manage their needs, and also easily scale to meet new and changing requirements as they grow. The system and method is easy to implement and administer. The activity based business process management system and method described above automates complex, non-linear processes without requiring users to change the way they do business, and integrates easily with existing applications and data sources. The provision for combination of existing project management methodologies with the above system and method for automating non-linear business processes results in a product that empowers business users to rapidly implement more complex, "non-linear" business processes.

The above system is designed to automate, track and report on complex, non-linear processes using timeline based automation. In one embodiment, the system includes a web-based interface to create and model processes through the project management interface. Using this system, activities are easy to define in a logical manner with assigned users, dependencies, conditions and timelines, and can be updated or modified as needed. Running processes are represented and administered from a Gantt chart. The system also enables users to make changes to project plans and have those changes immediately take effect on running processes.

In one embodiment, the system is based on rules-based business logic which controls process routing, and offers 'due date' management and escalation. Security systems may be included to provide for electronic signatures and audit trails.

Those of skill will appreciate that the various illustrative logical blocks, units, modules, circuits, and algorithm steps described in connection with the embodiments disclosed herein can often be implemented as electronic hardware, computer software, or combinations of both. To clearly illustrate this interchangeability of hardware and software, various illustrative components, units, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block or step is for ease of description. Specific functions or steps can be moved from one module or block without departing from the invention.

The various illustrative logical blocks, components, units, and modules described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

We claim:

1. A computer implemented method for managing a business process, where one or more processors are programmed to perform steps comprising:

receiving administrator input of information describing a business process, the information including at least a list of parent activities required to complete the process, a due date for completing the process, and one or more levels of child activities associated with at least one of the parent activities and required to complete the associated parent activity, the information associated with at least some activities including starting conditions comprising at least a list of any other activities requiring completion before the activity can start and the identification of one or more participants for carrying out any activity requiring participant input;

processing the administrator input information to create an activity based timeline definition from the input information which identifies activities which can be carried out in parallel and activities which require completion of one or more prior activities in order to start, creation of the activity based timeline further comprising assigning a desired time period and a start time for each activity, determining projected durations for each activity, using the projected durations to calculate a projected process completion date, and notifying the administrator if the projected completion date is after the due date entered by the administrator;

the step of determining projected durations for each activity comprising storing a total number of times the activity has run in the past, the identity of any named participant for each prior instance of an activity associated with a named participant, and the duration for each instance of the activity, assigning weights to the stored instances based on the closeness of the time duration of the instance to the desired time period for the activity, determining a weighted average from at least the assigned weights and total number of instances for each assigned weight compared to the stored total instances of the activity, and using the weighted average of past durations of the activity to predict a projected duration for the activity;

the step of determining the weighted average and projected duration for at least some activities where a selected participant is assigned to a new instance of the activity comprising using the assigned weights and total number of instances associated with the selected participant for each assigned weight compared to the stored total instances of the activity which are associated with the selected participant, and using the weighted average of past durations of the activity for the selected participant to predict duration for future instances of the same activity carried out by the selected participant;

starting the process by checking all activities in each level, the activity checking comprising checking starting conditions and starting any activity for which starting conditions are met while working through all the levels of activities, whereby all activities which can be started are run in parallel;

periodically checking the status of all activities to identify completed activities and starting any activities which are dependent on completed activities;

on detection of completion of all child activities required for completion of a parent activity, updating the timeline definition with the duration and completion date of the parent activity; and on detection of completion of all parent activities required for the process, terminating the process and updating the timeline definition with the completed process duration and the duration of each activity required for completing the process, and storing the updated timeline definition in a database.

2. The method of claim 1, wherein the administrator information further comprises deadlines for completing each activity, and processing the administrator information further comprises determining projected start times for each activity based on activity dependencies and the deadlines provided by the administrator, the activity based timeline definition listing the projected start times and durations for activities, displaying the initial activity based timeline definition on a user device, updating the activity based timeline definition with any activity status changes after checking the status of all activities, and displaying updated timeline definitions on request by a user.

3. The method of claim 2, wherein the updated timeline definition includes an identification of activities projected to be completed prior to or after the administrator requested deadline.

4. The method of claim 1, wherein the information associated with at least some activities further comprises conditions for sending activity related notifications to participants, and the step of starting an activity having one or more identified participants comprises at least sending a notification to start the activity to each identified participant for the activity.

5. The method of claim 4, further comprising processing the predicted durations and activity dependencies to identify activities predicted to be late in advance of completion of the activities, and providing a notification to at least the process administrator on identification of any activity predicted to be late.

6. The method of claim 1, further comprising receiving administrator input of a weighting for each activity, periodically processing an activity weighting and information received on the status of the activity after each activity status checking step to determine a percentage completion of the activity, creating periodic weighted activity reports indicating the current percentage completion for each activity and storing the current weighted activity report in a data base, and displaying the current weighted activity report in a display screen on receipt of a user request.

7. The method of claim 4, further comprising receiving participant input of activity status information including activity completion, and storing activity status inputs received from participants in the data base, including the duration of time used for completing the activity.

8. The method of claim 4, further comprising receiving administrator input of electronic forms associated with activities for completion by participants assigned to the activities and saving the electronic forms in the data base in association with the activities to which the forms are assigned, wherein the step of notifying participants to start any activities for which the activity starting conditions are met includes providing participants with a link to any forms associated with any activities to be started.

9. The method of claim 8, further comprising receiving completed electronic forms from participants and updating the activity based timeline with information provided on completed electronic forms.

10. The method of claim 8, further comprising creating each electronic form in a word processing document including a graphical interface plug in which converts the word processing document to a HTML (hyper text mark up language) document, the step of providing the form to a participant comprising displaying the electronic form on a participant's browser as a HTML web page.

11. The method of claim 1, wherein the information associated with each activity includes action to be taken if the activity is not completed within a selected time limit calculated from a configured activity start time to an administrator entered due date.

12. The method of claim 11, wherein the step of periodically checking activity status includes checking for activities not completed within the selected time period, checking action to be taken if an activity is not completed with the selected time period, marking the activity as complete if the action to be taken is to cancel the activity, and starting any activities dependent on the canceled activity.

13. The method of claim 1, further comprising creating an activity execution database including an activity instance number and duration for each activity associated with a project, the activity instance number being equal to the total of times the activity associated with a process has run, updating the timeline definition and incrementing the activity instance number for the activity in the activity execution database by one and storing the activity duration each time the activity is completed in a new instance of the process.

14. The method of claim 13, further comprising identification of any participants associated with each completed activity in the activity execution database, and creation of participant activity instance numbers for each participant who carried out a completed activity and the duration of the activity associated with each participant, whereby the activity instance numbers for each activity comprise a total activity instance number, identification of any participants involved with each instance of the activity, and the duration for each instance of the activity.

15. The method of claim 1, wherein
the step of checking for completed activities comprises checking the activity status starting at the lowest level of child activities and working up through all the levels while checking for completion of activities in each level in turn.

16. A computer implemented system for managing a business process, the system comprising:
a non-transitory computer readable medium configured to store computer executable programmed modules;
a processor communicatively coupled with the non-transitory computer readable medium configured to execute programmed modules stored therein;

a computer programmed process definition module, a computer programmed process automation module and a computer programmed prediction module, each programmed module being stored in the non-transitory computer readable medium;

a data base configured to store process status information and information on the duration of prior instances of activities required to complete a business process and identifications of any participants carrying out prior instances of the activities;

the process definition module being configured to display a series of graphical user interfaces on a user display device, to receive input from an administrator defining a process on the graphical user interfaces, the input comprising at least one condition for initiating the process, a due date for completing the process, a list of parent activities required for completing a process and any associated child activities required to complete a parent activity, and information associated with each activity, the information associated with each activity comprising at least conditions for starting and completing an activity and a projected completion date for the activity, and a named participant for at least some activities, wherein the conditions for starting at least some activities include dependencies on completion of one or more additional activities;

the prediction module being configured to perform predictive analysis for all running processes based on stored information on previous instances and stored durations of previous instances of the activities required for completing the processes, the predictive analysis for a process comprising assigning weights to the stored prior instances of the listed activities in the process definition module based on the closeness of the time duration of the instance of each activity to a desired duration for the activity based on the projected completion date of that activity, determining a weighted average from at least the assigned weights and total number of instances of the activity for each assigned weight compared to the stored total instances of the activity, using the weighted average of past durations of the activity to predict a projected duration for the activity, and predicting if an activity is going to be late based on the desired duration and the projected duration for the activity;

the prediction module being further configured to perform the predictive analysis using the stored prior instances of any listed activities associated with the named participant for any activities requiring a participant to complete the process, whereby the prediction of whether an activity associated with a participant is going to be late is based on the participant assigned to the activity and stored durations of instances of previous performance of the same activity by the same participant; and the process automation module being configured to create an activity based timeline definition from the saved input information which lists parent activities and any child activities associated with each parent activity which are to be completed in order to complete the parent activity, projected start times and projected durations for each activity and identification of activities which can be carried out in parallel and activities which require completion of one or more prior activities in order to start, to start any parent activity when starting conditions are met, to check all child activities required for completion of a parent activity which has started and start any child activities for which starting conditions are met, to periodically check activity status to identify completed activities and start any activities dependent on completion of detected completed activities, to update the timeline definition with the completion date of any completed activities and store the updated timeline definition in a data base, to update the timeline definition with the completion date of any completed parent activity and store the updated timeline definition on detection of completion of all child activities required for completion of the parent activity, and to terminate the process and update the timeline definition with the completed process duration and the duration of each activity required for completing the process on detection of completion of all activities required for a process, and to store the updated timeline definition in the data base.

17. The system of claim 16, wherein the process automation module is further configured to create a tree structure representing the defined process, the tree structure comprising a first level of nodes representing parent activities, and at least a second level of nodes representing any child activities required for completion of a first level parent activity.

18. The system of claim 17, wherein the tree structure further comprises additional levels of child activities required for completion of child activities in preceding levels.

19. The system of claim 16, further comprising a reporting module stored in the non-transitory computer readable medium, wherein the reporting module is configured to create status reports on receipt of report requests from authorized users.

20. The system of claim 19, wherein the reporting module is associated with the process automation module and is configured to receive and store information on current activity status for all activities and to update stored information on the number of instances each activity has been run with each new instance of the activity and the duration of each new activity instance.

21. The system of claim 16, wherein the prediction module is configured to send a notification to a selected user on predicting that an activity is going to be late.

22. The system of claim 19, wherein the reporting module is configured to create a plurality of different status reports, comprising at least a process timeline report including a timeline for at least some activities required for completing the process, an identification of whether an activity is running or completed, an identification of any activities which are late, an identification of a projected start date for any activity which is not yet started, and an identification of a projected complete date for any activity which is not yet completed.

23. The system of claim 22, wherein the status reports include a plurality of different format timeline reports including reports listing the status of parent activities only and reports listing the status of all parent and child activities.

24. The system of claim 22, wherein the status reports include a user interface for enabling a user to input commands to extend or reduce an activity duration and to cancel an activity.

25. The system of claim 22, wherein the reporting module is further configured to create activity weighting status charts based on user input of activity weightings representing the order of importance of activities for completing a process, the activity weighting status charts identifying parent activity status based on a percentage completion calculated using the weighting of the parent activity and each associated child activity and the current status of each child activity.

26. The system of claim 25, wherein the activity weighting status charts include a user interface for switching between different views, the views including an aggregate view of the calculated percentage completion of parent activities alone and expanded views including the calculated percentage completion of all child activities under a user selected parent activity.

27. The system of claim 16, further comprising an electronic form (eForm) processing module stored in the non-transitory computer readable medium, wherein the eForm module is configured to create electronic forms associated with respective activities for each process based on administrator input of form criteria for each activity related electronic form and to display selected electronic forms to participants associated with the respective activities for entry of activity status information by the participants during running of the process.

28. The system of claim 27, wherein the eForm processing module is configured for administrator input of form criteria in a word processing document, for converting the word processing document into a HTML (hyper text mark up language) eForm, and storing the eForm in association with an activity requiring the eForm, and for displaying the eForm on a participant's browser as a HTML web page when the associated activity is started.

29. The system of claim 16, wherein the series of graphical user interfaces comprise at least a process definition screen for listing parent activities and associated child activities for completing a process, the process definition screen including at least one user interface icon for clicking by a user to display a secondary graphical user interface for receiving user entry of activity associated information.

30. The system of claim 29, wherein the secondary graphical user interface comprises a pop up window on the process definition screen.

31. The system of claim 29, wherein the graphical user interfaces further comprise a first pop up window for entry of an activity identifier and activity instructions including duration and a second pop up window for entry of at least one participant for completing the activity.

32. The system of claim 31, wherein the graphical user interfaces further comprise at least one interface for entering any dependent conditions for starting and completing the activity, the dependent conditions for starting an activity including a list of any child activities to be completed before starting the activity.

33. The system of claim 32, wherein the user selectable conditions for completing the activity include completion of all activity related tasks by assigned participants and other criteria to be met.

34. The system of claim 32, further comprising a graphical user interface for entry of any conditions for enabling the activity.

35. The system of claim 32, further comprising a graphical user interface for selective entry of the projected completion date for the activity and selection of an action to be taken from a list of possible actions on expiry of the projected completion date without activity completion.

36. The system of claim 31, further comprising a notifications interface for user entry of notifications to be sent, deadlines for sending notifications, and selected participants to receive notifications.

37. The system of claim 31, further comprising at least one user interface having an option for user entry of a selected e-form to be associated with the activity.

38. The system of claim 17, wherein the process automation module is configured to check for activity completion starting at the lowest level of child activities and working up through each activity level by checking each activity in each level in turn until the activities in each level are all checked for completion.

39. A system comprising at least one computer communicatively coupled with at least one non-transitory computer readable medium, wherein the computer is programmed for activity based management of a business process by:
providing a process management interface for administrator entry of selected information regarding a process to be run, the selected information including at least a process identifier, a list of parent and child activities required to complete the process, a due date for completing the process, any selected participants associated with each activity requiring participant input, and conditions for starting, carrying out, and completing each activity;
storing all process information entered by an administrator in the non-transitory computer readable medium;
processing the information entered by the administrator to create an activity based timeline definition for running the process, the timeline definition comprising a tree structure having a first level of nodes comprising parent activities and additional levels of nodes under the first level comprising any child activities associated with the respective parent activities;
creation of the activity based timeline further comprising assigning a desired time period and a start time for each activity, determining projected durations for each activity, using the projected durations to calculate a projected process completion date, and notifying the administrator if the projected completion date is after the due date entered by the administrator;
the step of determining projected durations for each activity comprising storing a total number of times the activity has run in the past and the duration for each instance of the activity, the stored information for prior instances for any activity requiring a participant including the name of the participants associated with each prior instance of the activity, assigning weights to the stored instances based on the closeness of the time duration of the instance to the desired time period for the activity, determining a weighted average from at least the assigned weights and total number of instances for each assigned weight compared to the stored total instances of the activity, and using the weighted average of past durations of the activity to predict a projected duration for the activity;
the step of determining a projected duration for any activity having a selected participant comprising using the assigned weights and total number of instances associated with the selected participant for each assigned weight compared to the stored total instances of the activity which are associated with the selected participant, and using the weighted average of past durations of the activity for the selected participant to predict duration for future instances of the same activity carried out by the selected participant;
starting the process on detection of a process starting condition; and
periodically monitoring the status of all activities in each level of the tree structure and starting any activities for which starting conditions are met and repeating the monitoring and starting of activities for each level of activities at periodic intervals, whereby any parent or child activity dependent on a completion of one or more other activities is started when all dependent activities are detected to be complete;
the periodic status monitoring further comprising checking for completion of all child activities required for completion of a parent activity and updating the timeline definition with information on any completed parent activity, and checking for completion of all parent activities in the first level and terminating the process when all parent activities are completed.

40. A non-transitory computer readable medium having stored thereon one or more sequences of instructions for causing one or more processors to perform the steps for managing a business process, the steps comprising:

providing a process management interface for administrator entry of selected information regarding a process to be run, the selected information including at least a process identifier, a list of parent and child activities required to complete the process, any selected participants associated with activities requiring participant input, conditions for starting, carrying out, and completing each activity, and a due date for completing the process;

saving all process information entered by an administrator;

processing the information entered by the administrator to create an activity based timeline definition for running the process, the timeline definition comprising a tree structure having a first level of nodes comprising parent activities and one or more additional levels of nodes comprising any child activities associated with respective parent activities;

creation of the activity based timeline further comprising assigning a desired time period and a start time for each activity, determining projected durations for each activity, using the projected durations to calculate a projected process completion date, and notifying the administrator if the projected completion date is after the due date entered by the administrator;

the step of determining projected durations for each activity comprising storing a total number of times the activity has run in the past and the duration for each instance of the activity, the stored information for prior instances for any activity having a selected participant including the name of the participants associated with each prior instance of the activity, assigning weights to the stored instances based on the closeness of the time duration of the instance to the desired time period for the activity, determining a weighted average from at least the assigned weights and total number of instances for each assigned weight compared to the stored total instances of the activity, and using the weighted average of past durations of the activity to predict a projected duration for the activity;

the step of determining a projected duration for any activity having a selected participant comprising using the assigned weights and total number of instances associated with the selected participant for each assigned weight compared to the stored total instances of the activity which are associated with the selected participant, and using the weighted average of past durations of the activity for the selected participant to predict duration for future instances of the same activity carried out by the selected participant;

starting the process by checking all activities in each level, the activity checking comprising checking starting conditions and starting any activity for which starting conditions are met while working through all the levels of activities, whereby all activities which can be started are run in parallel;

periodically checking the status of all activities to identify completed activities and starting any activities which are dependent on completed child activities;

on detection of completion of all child activities required for completion of a parent activity, updating the timeline definition with the duration and completion date of the parent activity; and on detection of completion of all parent activities required for the process, terminating the process and updating the timeline definition with the completed process duration and the duration of each activity required for completing the process, and storing the updated timeline definition in a database.

* * * * *